(12) United States Patent
Choudhary et al.

(10) Patent No.: US 11,593,634 B2
(45) Date of Patent: Feb. 28, 2023

(54) ASYNCHRONOUSLY TRAINING MACHINE LEARNING MODELS ACROSS CLIENT DEVICES FOR ADAPTIVE INTELLIGENCE

(71) Applicant: Adobe Inc., San Jose, CA (US)

(72) Inventors: Sunav Choudhary, Bokaro Steel (IN); Saurabh Kumar Mishra, Sonbhadra (IN); Manoj Ghuhan A, Karur (IN); Ankur Garg, Chandigarh (IN)

(73) Assignee: Adobe Inc., San Jose, CA (US)

( * ) Notice: Subject to any disclaimer, the term of this patent is extended or adjusted under 35 U.S.C. 154(b) by 950 days.

(21) Appl. No.: 16/012,356

(22) Filed: Jun. 19, 2018

(65) Prior Publication Data

US 2019/0385043 A1     Dec. 19, 2019

(51) Int. Cl.
*G06N 3/08* (2006.01)
*G06N 3/04* (2023.01)
(Continued)

(52) U.S. Cl.
CPC .......... *G06N 3/08* (2013.01); *G06F 13/4213* (2013.01); *G06F 13/4226* (2013.01);
(Continued)

(58) Field of Classification Search
CPC ........ G06N 20/00; G06N 3/0454; G06N 3/08; G06N 7/00; G06F 16/256; G06F 13/4213; G06F 13/4226; G06F 13/4239
See application file for complete search history.

(56) References Cited

U.S. PATENT DOCUMENTS 10,769,549 B2 *  9/2020  Bonawitz ............... G06N 5/022
10,922,627 B2 *  2/2021  Musuvathi ............. G06N 20/00
(Continued)

FOREIGN PATENT DOCUMENTS

WO   WO-2018049595 A1 *  3/2018
WO   WO-2019219846 A1 * 11/2019  .......... G06K 9/6256

OTHER PUBLICATIONS

Guo et Gong, "Practical Collaborative Learning for Crowdsensing in the Internet of Things with Differential Privacy" May 30, 2018. (Year: 2018).*

(Continued)

*Primary Examiner* — Miranda M Huang
*Assistant Examiner* — Chase P. Hinckley
(74) *Attorney, Agent, or Firm* — Keller Preece PLLC

(57) ABSTRACT

This disclosure relates to methods, non-transitory computer readable media, and systems that asynchronously train a machine learning model across client devices that implement local versions of the model while preserving client data privacy. To train the model across devices, in some embodiments, the disclosed systems send global parameters for a global machine learning model from a server device to client devices. A subset of the client devices uses local machine learning models corresponding to the global model and client training data to modify the global parameters. Based on those modifications, the subset of client devices sends modified parameter indicators to the server device for the server device to use in adjusting the global parameters. By utilizing the modified parameter indicators (and not client training data), in certain implementations, the disclosed systems accurately train a machine learning model without exposing training data from the client device.

20 Claims, 13 Drawing Sheets

(51) Int. Cl.
  *G06N 7/00* (2023.01)
  *G06N 20/00* (2019.01)
  *G06F 16/25* (2019.01)
  *G06F 13/42* (2006.01)

(52) U.S. Cl.
  CPC ........ *G06F 13/4239* (2013.01); *G06F 16/256* (2019.01); *G06N 3/0454* (2013.01); *G06N 7/00* (2013.01); *G06N 20/00* (2019.01)

(56) References Cited

U.S. PATENT DOCUMENTS

| | | | | |
|---|---|---|---|---|
| 11,487,698 | B2* | 11/2022 | Ahn | G06F 15/17331 |
| 2015/0127337 | A1* | 5/2015 | Heigold | G06N 3/0454 704/232 |
| 2017/0039485 | A1* | 2/2017 | Kadav | G06N 20/00 |
| 2017/0091651 | A1* | 3/2017 | Miao | G06N 20/00 |
| 2017/0091652 | A1* | 3/2017 | Miao | G06N 20/20 |
| 2017/0147920 | A1* | 5/2017 | Huo | G06N 3/084 |
| 2018/0314981 | A1* | 11/2018 | Chen | G06F 9/5072 |
| 2018/0349313 | A1* | 12/2018 | Ahn | H04L 67/10 |
| 2019/0220758 | A1* | 7/2019 | Talyansky | G06N 20/20 |
| 2019/0311298 | A1* | 10/2019 | Kopp | G01C 21/3602 |
| 2019/0311813 | A1* | 10/2019 | Hie | G16H 70/40 |
| 2019/0340534 | A1* | 11/2019 | McMahan | G06N 7/005 |
| 2020/0242466 | A1* | 7/2020 | Mohassel | H04L 9/008 |
| 2021/0065002 | A1* | 3/2021 | Samek | G06N 3/08 |

OTHER PUBLICATIONS

Kim et al., "Federated Tensor Factorization for Computational Phenotyping" Aug. 2017, KDD'17, pp. 887-895. (Year: 2017).*
Zhang et al., "Improving the Privacy and Accuracy of ADMM-Based Distributed Algorithms" Jun. 6, 2018, Proceedings of the 35th International Conference on Machine Learning. (Year: 2018).*
Zhao et al., "Federated Learning with non-IID Data" Jun. 2, 2018, pp. 1-13. (Year: 2018).*
Miao et al., "Distributed Personalization" Aug. 2015, KDD'15, pp. 1989-1998. (Year: 2015).*
Zhu et al., "A Block-wise, Asynchronous and Distributed ADMM Algorithm for General Form Consensus Optimization" Feb. 24, 2018. (Year: 2018).*
Zhang et al., "A Systematic DNN Weight Pruning Framework using Alternating Direction Method of Multipliers" Apr. 23, 2018, pp. 1-16. (Year: 2018).*
Hardy et al., "Distributed deep learning on edge devices: feasibility via adaptive compression" Nov. 6, 2017. (Year: 2017).*
Vanhaesebrouck et al., "Decentralized Collaborative Learning of Personalized Models over Networks" Feb. 15, 2017. (Year: 2017).*
Li et al., "Robust Decentralized Learning Using ADMM with Unreliable Agents" May 21, 2018, pp. 1-23. (Year: 2018).*
Smith et al., "Federated Multi-Task Learning" Feb. 27, 2018, pp. 1-19. (Year: 2018).*
Afshar et al., "COPA: Constrained PARAFAC2 for Sparse and Large Datasets" Mar. 12, 2018, pp. 1-10. (Year: 2018).*
Wei et al., "An Inner Loop Free Solution to Inverse Problems using Deep Neural Networks" Nov. 14, 2017, pp. 1-20. (Year: 2017).*
Zhang et Wang, "Privacy-Preserving Decentralized Optimization Based on ADMM" Jul. 13, 2017, arXiv: 1707.04338v1, pp. 1-12. (Year: 2017).*
Dai et al., "Privacy Preserving Federated Big Data Analysis" May 27, 2017, pp. 29-82. (Year: 2017).*
Guo et al., "Practical Collaborative Learning for Crowdsensing in the Internet of Things with Differential Privacy" May 30, 2018, bibliographic data. (Year: 2018).*
Geyer et al., "Differentially Private Federated Learning: A Client Level Perspective" Mar. 1, 2018, arXiv: 1712.07557v2, pp. 1-7. (Year: 2018).*
Lin et al., "Deep Gradient Compression: Reducing the Communication Bandwidth for Distributed Training" Feb. 5, 2018, arXiv 1712.01887v2, pp. 1-13. (Year: 2018).*
Stich, Sebastian "Local SGD Converges Fast and Communicates Little" May 24, 2018, arXiv: 1805.09767v1, pp. 1-11. (Year: 2018).*
Samek et al., "Concepts for Distributed Learning of Neural Networks and/or Parameterization Updates Therefor" May 17, 2018, EP18173020.1, pp. 1-83. (Year: 2018).*
Agarwal et al., "cpSGD: Communication-efficient and differentially-private distributed SGD" May 27, 2018, arXiv: 1805.10559v1, pp. 1-28. (Year: 2018).*
Caldas et al., "Federated Kernelized Multi-Task Learning" Feb. 2018. (Year: 2018).*
Chen et al., "Federated Meta-Learning for Recommendation" Feb. 22, 2018. (Year: 2018).*
Matomoros, Javier "Asynchronous Online ADMM for Consensus Problems" 2017, pp. 5875-5879. (Year: 2017).*
Konecny, Jakub "Stochastic, Distributed, and Federated Optimization for Machine Learning" Jul. 4, 2017, pp. 1-178. (Year: 2017).*
Reddi, Shashank "New Optimization Methods for Modern Machine Learning" Jul. 2017, pp. 1-255. (Year: 2017).*
Wang, Yushi "CO-OP: Cooperative Machine Learning from Mobile Devices" 2017, pp. 1-41. (Year: 2017).*
Bellet et al., "Personalized and Private Peer-to-Peer Machine Learning" Feb. 19, 2018, pp. 1-19. (Year: 2018).*
"Akamai Reveals 2 Seconds as the New Threshold of Acceptability for ECommerce Web Page Response Times," https://www.akamai.com/us/en/about/news/press/2009-press/akamai-reveals-2-seconds-as-the-new-threshold-of-acceptability-for-ecommerce-web-page-responsetimes.jsp, Sep. 14, 2009.
Carbon60 "Milliseconds are Money: How Much Performance Matters in the Cloud," http://www.carbon60.com/blog/milliseconds-are-money-how-much-performance-matters-in-the-cloud, as retrieved on Aug. 15, 2018.
Dua Dheeru and Efi Karra Taniskidou. UCI machine learning repository, 2017.
Duchi, John, Elad Hazan, and Yoram Singer. "Adaptive subgradient methods for online learning and stochastic optimization." Journal of Machine Learning Research. Jul. 12, 2011: 2121-2159.
G. B. Folland. Real Analysis: Modern Techniques and Their Applications. Wiley, New York, 1999.
Vincent, James, The Verge "Apple announces new machine learning API to make mobile AI faster" https://www.theverge.com/2017/6/5/15725994/apple-mobile-ai-chip-announced-wwdc-2017, dated Jun. 5, 2017.
Jeannie R Albrecht, Christopher Tuttle, Alex C Snoeren, and Amin Vahdat. Loose synchronization for large-scale networked systems. In USENIX Annual Technical Conference, General Track, pp. 301-314, 2006.
Konečný, Jakub, et al. "Federated optimization: Distributed machine learning for on-device intelligence." arXiv preprint arXiv:1610.02527 (2016).
Langford, John, Alexander J. Smola, and Martin Zinkevich. "Slow learners are fast." Advances in Neural Information Processing Systems 22 (2009): 2331-2339.
McMahan, B., and Daniel Ramage. "Federated learning: Collaborative machine learning without centralized training data." Google Research Blog (2017).
McMahan, H. Brendan, et al. "Communication-efficient learning of deep networks from decentralized data." arXiv preprint arXiv:1602.05629 (2016).
Parker, Charles L., "Machine Learning From Streaming Data: Two Problems, Two Solutions, Two Concerns, and Two Lessons," https://blog.bigml.com/2013/03/12/machine-learning-from-streaming-data-two-problems-two-solutions-two-concerns-and-two-lessons/, Mar. 12, 2013.
Stephen Boyd, Neal Parikh, Eric Chu, Borja Peleato, and Jonathan Eckstein. Distributed optimization and statistical learning via the alternating direction method of multipliers. Foundations and Trends in Machine Learning, 3(1):1-122, 2011.Stephen Boyd, Neal Parikh, Eric Chu, Borja Peleato, and Jonathan Eckstein. Distributed opti-

(56) References Cited

OTHER PUBLICATIONS mization and statistical learning via the alternating direction method of multipliers. Foundations and Trends in Machine Learning, 3(1):1-122, 2011.
"The EU General Data Protection Regulation (GDPR)," https://www.itgovernance.co.uk/data-protection-dpa-and-eu-data-protection-regulation, as retrieved on Jul. 26, 2018.
Zhang, Ruiliang, and James Kwok. "Asynchronous distributed ADMM for consensus optimization." International Conference on Machine Learning. 2014.

* cited by examiner

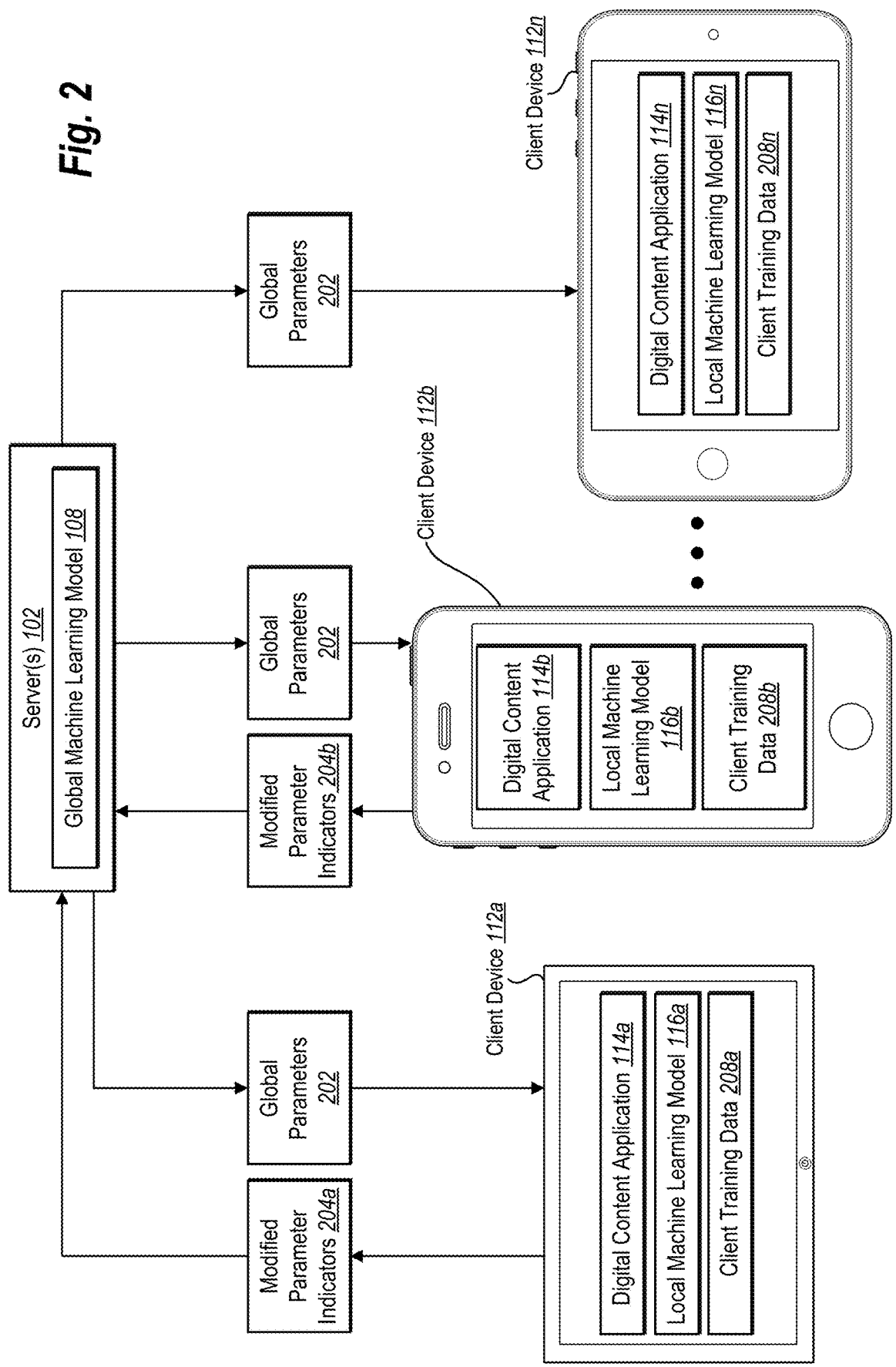

ASYNCHRONOUSLY TRAINING MACHINE LEARNING MODELS ACROSS CLIENT DEVICES FOR ADAPTIVE INTELLIGENCE

BACKGROUND

Computer scientists increasingly apply machine learning models to improve a computer's ability to perform a variety of tasks. Such machine learning models may range from regression models to artificial neural networks, such as linear or logistic regression models and convolutional neural networks. When training such models, conventional machine learning systems often use a central server that hosts a machine learning model. In particular, conventional machine learning systems frequently train a machine learning on a central server using client data to learn parameters for the model.

While conventional machine learning systems have improved and expedited machine learning of computer tasks, conventional systems that rely on data from client devices have a number of significant problems. For example, conventional machine learning systems often cannot generate accurate digital models without collecting and utilizing private digital information from client devices. Indeed, conventional machine learning systems often require a large volume of training data to generate accurate models. To gather this information, many conventional machine learning systems monitor data from client devices and then utilize that data to train models at central servers. Recent years, however, have seen increasing demands from both clients and governing institutions to reduce or eliminate use of private information from client devices. Without collecting and utilizing such information, many conventional machine learning systems lack requisite training data and cannot generate accurate models.

In addition to these shortcomings in accuracy, conventional machine learning systems also use an inflexible training approach. For instance, conventional systems that use centralized training often lack models with the functionality or flexibility to adapt to changes in client-data privacy and client-data sharing or use rigid models that unnecessarily slow down the training process. For instance, some conventional machine learning models pull or request client data from client devices to train a machine learning model on a central server. But such conventional systems cannot train (or slow training of) a centralized model when client devices that previously shared client data disconnect from a network, change client-data-privacy settings to prevent sharing client data, or suffer from a software or hardware malfunction.

Beyond an inflexible training approach, conventional machine learning systems also inefficiently consume computing resources. In particular, conventional systems that utilize a central server for training often require significant server processing resources to store and analyze thousands (or millions) of data samples. Accordingly, the process of training a machine learning model can impose significant computational and storage costs on implementing servers.

SUMMARY

This disclosure describes one or more embodiments of methods, non-transitory computer readable media, and systems that solve the foregoing problems in addition to providing other benefits. For example, in some embodiments, the disclosed systems asynchronously train a machine learning model across client devices that implement local versions of the model while also preserving client data privacy. To train the model across devices the disclosed systems can send global parameters for a global machine learning model from a server device to client devices. In a partial barrier approach, a subset of the client devices uses local machine learning models corresponding to the global model to modify the global parameters. Based on those modifications, the subset of client devices sends modified parameter indicators to the server device for the server device to use in adjusting the global parameters. By requesting and receiving the modified parameter indicators (and not client training data), the disclosed systems can train a machine learning model on a cloud while preserving user data privacy without direct receipt of client data. Moreover, the disclosed systems can generate robust and stable parameter updates and provide individual client devices with an adaptive and intelligent experience in real time from fresh local data on client devices.

To illustrate, in some embodiments, the disclosed systems send global parameters for a global machine learning model to client devices that comprise local machine learning models corresponding to the global machine learning model. The systems subsequently receive modified parameter indicators from a subset of client devices. By using the local machine learning models, the global parameters, and client training data, the subset of client devices generates the modified parameter indicators. In response to receiving the modified parameter indicators, the disclosed systems generate adjusted global parameters for the global machine learning model and send the adjusted global parameters to the client devices for implementation with their respective local machine learning models.

BRIEF DESCRIPTION OF THE DRAWINGS

The detailed description refers to the drawings briefly described below.

FIG. 2 illustrates a flow diagram of an asynchronous training system training a machine learning model across client devices in accordance with one or more embodiments.

FIGS. 8A and 8B illustrate graphical user interfaces for a spam-email-detector application showing the accuracy of a machine learning model in multiple training iterations of classifying emails in accordance with one or more embodiments.

DETAILED DESCRIPTION

Figure 1:
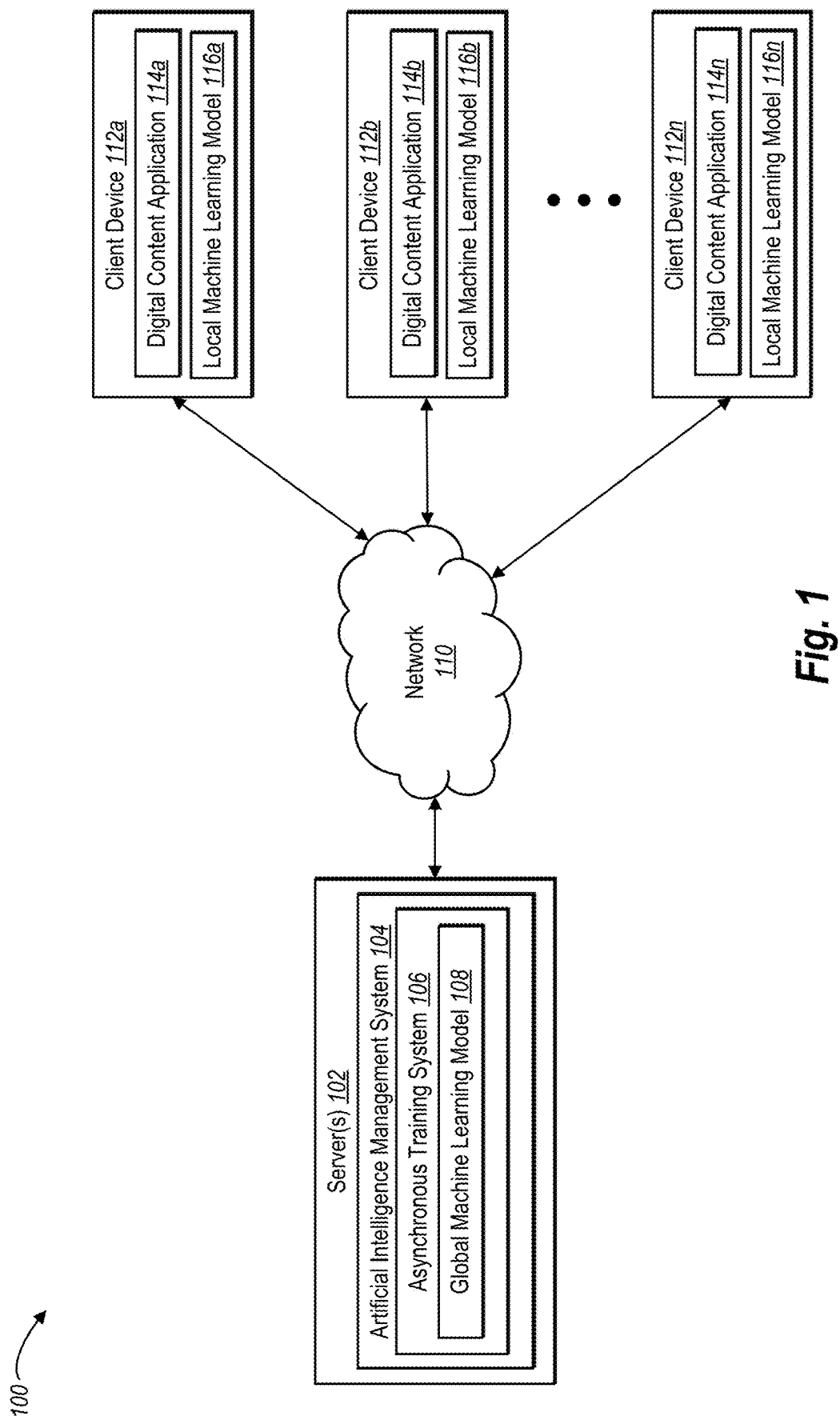
FIG. 1 illustrates a block diagram of an environment for implementing an artificial intelligence management system and an asynchronous training system in accordance with one or more embodiments.

One or more embodiments described herein include an asynchronous training system that trains a machine learning model across client devices that implement local versions of the model, without sending client training data from the client devices to a server device. For instance, in some implementations, the asynchronous training system iteratively sends global parameters of a machine learning model to client devices, receives modifications for the global parameters from a subset of the client devices (a subset identified based on a partial barrier approach), and adjusts the global parameters based on the modifications. In multiple iterations, subsets of client devices use local machine learning models to modify the global parameters and send modified parameter indicators to a server device for use in adjusting the global parameters. In this manner, the asynchronous training system can efficiently, accurately, and flexibly train the global machine learning model, without client training data leaving the client device.

To illustrate, in some embodiments, the asynchronous training system sends global parameters for a global machine learning model from a server to client devices that include local machine learning models corresponding to the global machine learning model. The asynchronous training system subsequently receives, at the server, modified parameter indicators from a subset of client devices. The asynchronous training system can utilize the subset of client devices to generate the modified parameter indicators in part by using the local machine learning models, the global parameters, and client training data on the subset of client devices. In response to receiving the modified parameter indicators at the server, the asynchronous training system generates adjusted global parameters for the global machine learning model and sends the adjusted global parameters from the server to the client devices for implementation in their respective local machine learning models.

In application, the asynchronous training system can train a variety of machine learning models. For instance, in some embodiments, the global machine learning model is a global neural network stored on a server device while the local machine learning models are local neural networks stored on individual client devices. Accordingly, the asynchronous training system may generate global-neural-network parameters for layers of the global neural network and send such parameters to client devices. By contrast, in certain implementations, the global machine learning model is a global regression model stored on a server device and the local machine learning models are local regression models, such as linear or logistic regression models, stored on client devices. Accordingly, the asynchronous training system may generate weights for the global regression model and send such weights to client devices. In some such embodiments, the asynchronous training system uses an asynchronous federated alternating direction method of multipliers (also called "AFADMM" below) to update local regression models on client devices and train a global regression model without exposing private client data.

As noted above, the asynchronous training system uses a partial barrier approach to training a model across client devices. Rather than receiving modified parameter indicators from the same set of client devices for each training iteration in synchrony, the asynchronous training system receives and uses modified parameter indicators from only a subset of client devices for each training iteration. This subset of client devices may differ from training iteration to training iteration. Accordingly, in some embodiments, the asynchronous training system determines that a subset of client devices for a given training iteration includes a threshold number of client devices that have generated modified parameter indicators. In response to determining that the subset satisfies the threshold number, the asynchronous training system generates adjusted global parameters for use in a subsequent training iteration.

In one or more embodiments, the asynchronous training system can also utilize a bounded delay condition to ensure a broad range of client devices contribute to training (without unnecessarily delaying training iterations). For example, because the subset of client devices sending modified parameter indicators may differ from training iteration to training iteration, the asynchronous training system can tally or track the number of training iterations in which a client device sends modified parameter indicators. For example, in some embodiments, the asynchronous training system identifies a client device from among a group of participating client devices that has not sent a set of modified parameter indicators to the servers in a threshold number of training iterations.

Upon the client device reaching the threshold number of training iterations, the asynchronous training system can wait a threshold time for the client device to generate modified parameter indicators. If the client device subsequently sends modified parameter indicators, the asynchronous training system uses the indicators to update global parameters for that particular training iteration. If the client device does not send modified parameter indicators within the threshold time, the asynchronous training system can remove the client device from further training. In this manner, the asynchronous training system can ensure that client devices with slower response times contribute to the resulting model, without unduly slowing the training process waiting for unresponsive client devices.

As mentioned above, the asynchronous training system can update global parameters based on modified parameter indicators generated by a subset of client devices. When adjusting the global parameters based on modified parameter indicators, the asynchronous training system can determine an average or weighted average of the modified parameter indicators received for a given iteration. For example, in certain embodiments, the asynchronous training system assigns a weight to modified parameter indicators from a particular client device based on a number of training samples from a client-training dataset corresponding to the client device. Based on these weights, the asynchronous training system can determine a weighted average for the modified parameter indicators and generate an adjusted global parameter based on the weighted average.

The disclosed asynchronous training system overcomes several technical deficiencies that hinder conventional machine learning systems. First, the asynchronous training system generates accurate machine learning models without exposing sensitive training data from client devices. To accurately train machine learning models while preserving client-data privacy, the asynchronous training system uses local versions of machine learning models on client devices to generate modified parameter indicators and a global machine learning model on a server device that updates based on the modified parameter indicators. By using such local and global machine learning models, the asynchronous training system can train highly accurate models based on thousands (or millions) of training samples without transmitting any client training data to a central server. The asynchronous training system can also improve accuracy of a machine learning model by allowing for real-time adaptation of global parameters from client devices over time. Accordingly, the asynchronous training system can provide client devices with a local machine learning model that delivers an intelligent and adaptive real-time experience while respecting user privacy.

Second, the asynchronous training system improves the functionality and flexibility of training machine learning models relative to conventional systems. For example, rather than relying on transmission from the same set of client devices for training data, in certain implementations, the asynchronous training system receives and uses modified parameter indicators from different subsets of client devices for different training iterations. Accordingly, when client devices that previously shared client data disconnect from a network, change client-data-privacy settings to prevent sharing client data, or suffer from a software or hardware malfunction, the asynchronous training system can still train the machine learning model using modified parameter indicators from a subset of client devices and preserve client-data privacy.

Third, the asynchronous training system more efficiently trains machine learning models using less server resources than conventional systems and distributing training activities across devices. As outlined above, the asynchronous training system can restrict communications between a central server and client devices to include only modified parameter indicators. This approach reduces storage and processing requirements while more efficiently distributing the training workload across devices. In particular, central servers can pass along some of the computing burden to individual client devices, without over-taxing individual client devices. As shown in a test implementation, a resource-constrained client device, such as a smartphone, that runs a native application to train the local machine learning model consumes relatively little computing resources. Moreover, the disclosed systems can reduce computer processing and storage requirements on central servers, by eliminating the burden of receiving, storing, and analyzing thousands (or millions) of data samples from client devices.

Fourth, the asynchronous training system also introduce a faster, more flexible approach to training machine learning models than previous systems. For example, as mentioned above, the asynchronous training system can employ a flexible-bounded-delay-training approach that ensures a broad range of client devices with different processing capabilities contribute to the global machine learning model without slowing training. The asynchronous training system can also avoid waiting on a set of client devices to send client data in synchrony. Rather, the asynchronous training system runs through training iterations quickly and efficiently by relying on only a subset of client devices for modified parameter indicators in each training iteration.

As illustrated by the foregoing discussion, this disclosure uses a variety of terms to describe features and advantages of the digital content generation system. For example, as used in this disclosure, the term "asynchronous training" refers to receiving or using training data from a subset of computer sources during a training iteration (as opposed to using training data from a set of computer sources that send data during each training iteration). In particular, in some cases, the term "asynchronous training" refers to receiving or using modified parameter indicators from a subset of client devices to adjust global parameters during a training iteration.

Relatedly, the term "machine learning model" refers to a computer model trained to perform one or more tasks by learning to approximate functions or parameters based on training input. In particular, in some embodiments, the term "machine learning model" refers to a computer-executable algorithm that automatically improves a computer's ability to perform one or more tasks by learning to approximate functions or parameters based on client training data.

As noted above, a machine learning model may be global or local. A "global machine learning model" refers to a machine learning model stored or implemented on a server or group of servers. By contrast, a "local machine learning model" refers to a machine learning model stored or implemented on a client device. In some embodiments, one or more local machine learning models correspond to a global machine learning model. For instance, a local machine learning model may be the same model as a global machine learning model, except that the locally modified parameters for the local machine learning model may differ after a training iteration in which a client device adjusts global parameters to generate locally modified parameters.

As noted above, a machine learning model may come in a variety of forms, such as a neural network or a regression model. The term "neural network" refers to a machine learning model patterned after a network of biological neurons that can be trained to learn non-linear functions based on training input. In particular, the term "neural network" can include a model of interconnected digital neurons that communicate and learn to approximate complex functions and generate outputs based on inputs provided to the model. A neural network includes an algorithm that implements deep learning techniques, that is, machine learning that utilizes a set of algorithms to attempt to model high-level abstractions in data. A neural network can include a variety of deep learning models, including convolutional neural networks, deep belief networks, or deep stacking networks.

By contrast, the term "regression model" refers to a statistical model for estimating relationship among parameters. For instance, a "regression model" includes a linear regression or a logistic regression that estimates a parameter for a function based on independent variables. A regression model may likewise use Stochastic Gradient Descent, Adaptive Gradient Algorithm ("AdaGrad"), Adaptive Moment Estimation ("Adam"), Alternating Direction Method of Multipliers ("ADMM"), or other optimization algorithms.

In some embodiments, machine learning models implement parameters. The term "global parameter" refers to an estimated or learned variable initiated, adjusted, or configured by a global machine learning model. In particular, in some cases, the term "global parameter" refers to a configuration variable that the asynchronous training system initiates or configures for use in local machine learning models based on modified parameter indicators. As just suggested, in some cases, the asynchronous training system initiates global parameters before sending initial global parameters to client devices for implementation. Relatedly, the term "adjusted global parameter" refers to a global parameter that the asynchronous training system has adjusted based on modified parameter indicators (from client devices).

The term "locally modified parameter" refers to a parameter modified by a client device through a training iteration of a local machine learning model. In particular, the term "locally modified parameter" refers to a parameter estimated by a client device after a training iteration of a local machine learning model based on client training data. As suggested above, in some cases, a client device generates a locally modified parameter after implementing a global parameter in a local machine learning model, running a training iteration of the local machine learning model with client training data, and adjusting the global parameter to reduce a loss from a loss function.

Relatedly, the term "modified parameter indicator" refers to an indication of a modification to a global parameter based on (or comprising) a locally modified parameter. In particular, in some embodiments, the term "modified parameter indicator" refers to a parameter update differential that represents a difference between a locally modified parameter and a global parameter. By contrast, in some embodiments, the term "modified parameter indicator" refers to a locally modified parameter.

The term "client training data" refers to data from a client device utilized to train a machine learning model. In particular, "client training data" includes input into, received by, or stored by a client device to train a local machine learning model. For example, in some embodiments, client training data may include user activity via a client device, a browser type, content selections, emails, digital content consumed, a native application type, search queries, messages, user commands, websites visited, purchases, demographic information, geographic location, account information, or some other data type. In certain embodiments, a portion of client training data may include features, such as features within an input data matrix or features within a response vector.

In some cases, client training data includes "ground-truth features" and "training model input data." The term "ground-truth feature" refers to empirically observed data utilized as a reference to train or tune a machine learning model. For instance, a ground-truth feature includes user input/action, a characteristic of a client device, or a characteristic of a user associated with a client device utilized as a reference point to tune a machine learning model.

By contrast, the term "training model input data" refers to data analyzed by a machine learning model to generate an output (e.g., data analyzed to generate a classifier, prediction, or suggested modification for digital content). In particular, the term "training model input data" includes data input into, received by, or stored by a client device that is analyzed by a local machine learning model to predict a particular feature. For example, the asynchronous training system can apply a local machine learning model to training model input data (e.g., contents of an email message) on a client device to generate a predicted feature (e.g., predict that the email is spam). The predicted feature can then be compared to a ground-truth feature (e.g., an indication that the user has already marked the email as spam) to generate locally modified parameters and tune the local machine learning model.

Turning now to FIG. 1, this figure depicts a block diagram illustrating an environment 100 in which an asynchronous training system 106 can operate in accordance with one or more embodiments. As illustrated in FIG. 1, the environment 100 includes server(s) 102; client devices 112a-112n; and a network 110, such as the Internet. The client devices 112a-112n may include, but are not limited to, mobile devices (e.g., smartphones, tablets), laptops, desktops, or any other type of computing device, such as those described below in relation to FIG. 12. Similarly, the network 110 may comprise any of the networks described below in relation to FIG. 12.

As shown in FIG. 1, the server(s) 102 host an artificial intelligence management system 104, which includes the asynchronous training system 106 and a global machine learning model 108. Both the artificial intelligence management system 104 and the global machine learning model 108 may take a variety of forms and perform a variety of tasks. For example, in some embodiments, the artificial intelligence management system 104 can use the global machine learning model 108 to analyze, modify, manage, and perform tasks for digital content campaigns, digital images, or digital texts. Based on user input from one of the client devices 112a-112n, for instance, the artificial intelligence management system 104 can analyze, organize, or modify digital images, such as by identifying objects portrayed in digital images, recommending modifications to digital images, animating digital objects, or reorganizing objects within digital images. Using the global machine learning model 108, the artificial intelligence management system 104 can also analyze, create, or modify digital texts, such as by generating suggested revisions to textual content or generating suggested target audiences for textual content.

In certain embodiments, the artificial intelligence management system 104 can personalize delivery or selection of digital content for the client devices 112a-112n. For instance, in some implementations, the artificial intelligence management system 104 uses the global machine learning model 108 to determine digital content that would interest users of the client devices 112a-112n and send digital content of interest (or recommendations of digital content) to the client devices 112a-112n as part of a digital content campaign. Additionally, in some cases, the artificial intelligence management system 104 can use the global machine learning model 108 to categorize digital content that reflects user preferences and identifies digital content received by the client devices 112a-112n for their respective users (e.g., by identifying objects within digital images, identifying an email as spam or as important).

As further illustrated in FIG. 1, the client devices 112a-112n communicate through the network 110 with the artificial intelligence management system 104 and the asynchronous training system 106 via the server(s) 102. Accordingly, a user associated with one of the client devices 112a-112n can access one or more digital images, digital texts, software applications, or other digital content provided (in whole or in part) by the artificial intelligence management system 104, including to download a native application. Additionally, in some embodiments, third party server(s) (not shown) provide data to the server(s) 102 that enable the artificial intelligence management system 104 or the asynchronous training system 106 to access, download, or upload digital images, digital texts, software applications, or other digital content via the server(s) 102.

As indicated in FIG. 1, the client devices 112a-112n respectively include digital content applications 114a-114n. The digital content applications 114a-114n may take a variety of forms, such as native applications or web browsers that access websites for designing digital illustrations, generating audio, presenting multimedia content, animating digital characters, or presenting or editing digital documents. To access the artificial intelligence management system 104, in certain embodiments, a user interacts with one of the digital content applications 114a-114n on the client devices 112a-112n. As suggested above, in some embodiments, the digital content applications 114a-114n comprise web browsers, applets, or other software applications (e.g., native applications) available to the client devices 112a-112n. Additionally, in some instances, the digital content applications 114a-114n are integrated within applications or webpages.

As further shown in FIG. 1, the client devices 112a-112n and digital content applications 114a-114n respectively include local machine learning models 116a-116n. Each of the local machine learning models 116a-116n correspond to the global machine learning model 108. Accordingly, in some embodiments, the asynchronous training system 106 provides global parameters to the client devices 112a-112n for implementation on the local machine learning models 116a-116n to perform any of the variety of tasks described above for the global machine learning model 108. Using the local machine learning models 116a-116n, in some cases, the client devices 112a-112n can analyze, modify, manage, and perform tasks for digital content campaigns, digital images, or digital texts. The client devices 112a-112n may also categorize digital content that reflects user preferences or identify digital content received by the client devices 112a-112n for their respective users.

Although FIG. 1 illustrates the asynchronous training system 106 implemented as part of the server(s) 102, the asynchronous training system 106 can also be implemented (e.g., perform acts or processes) via the client device(s) 112a-112n. For example, as suggested above, in a given training iteration the asynchronous training system 106 can utilize the client devices 112a-112n to receive global parameters for the global machine learning model 108 from the server(s) 102. After receipt of the global parameters for a given training iteration, some of the client devices 112a-112n use their respective local machine learning model 116a-116n, global parameters, and client training data at the client devices 112a-112n to generate locally modified parameters. Based on the locally modified parameters, a subset of the client devices 112a-112n subsequently sends modified parameter indicators to the server(s) 102.

As mentioned above, in certain embodiments, the server(s) 102 both send global parameters to the client devices 112a-112n and receive modified parameter indicators from a subset of the client devices 112a-112n. As part of a given training iteration, the server(s) 102 may further generate adjusted global parameters based on the modified parameter indicators and send the adjusted global parameters to the client devices 112a-112n. Moreover, as part of each subsequent training iteration the asynchronous training system 106 can utilize the client devices 112a-112n to implement the adjusted global parameters in their respective local machine learning models 116a-116n.

In addition to using modified parameter indicators, in some embodiments, the server(s) 102 further uses training samples to train the global machine learning model 108 to learn global parameters. For instance, in addition to using modified parameter indicators from the client devices 112a-112n, the asynchronous training system 106 optionally implements the global machine learning model 108 to generate adjusted global parameters based on global parameters and global training data (e.g., computer-generated training data or client training data from different sources).

While FIG. 1 depicts only a few client devices, in alternative embodiments, the environment 100 includes more than one of both of the client devices 112a-112n and their respective users. The environment 100 can include any number of client devices. For example, in some embodiments, the environment 100 includes hundreds, thousands, millions, or billions of users and corresponding client devices. Moreover, although FIG. 1 illustrates a particular arrangement for the server(s) 102, the client devices 112a-112n, and the network 110, various additional arrangements are possible. For example, the client devices 112a-112n may directly communicate with the server(s) 102 and thereby bypass the network 110.

FIG. 2 provides an example of the asynchronous training system 106 described above. In particular, FIG. 2 depicts a flow diagram of the asynchronous training system 106 training a machine learning model across client devices that implement local versions of the model in multiple training iterations in accordance with one or more embodiments. As depicted, in each training iteration, the asynchronous training system 106 utilizes the server(s) 102 to sends a set of global parameters to the client devices 112a-112n. After receiving a set of the global parameters, the asynchronous training system 106 utilizes some or all of the client devices 112a-112n to implement the global parameters in the local machine learning models 116a-116n. A subset of the client devices 112a-112n further generate and send modified parameter indicators to the server(s) 102.

As indicated above, the local machine learning models 116a-116n correspond to the global machine learning model 108. For instance, in certain embodiments, the local machine learning models 116a-116n represent copies of the global machine learning model 108. In multiple training iterations, some or all of the client devices 112a-112n implement global parameters from the server(s) 102 in their respective local machine learning models 116a-116n and adjust the global parameters to reduce a loss determined locally by the client devices 112a-112n. Through multiple training iterations, the asynchronous training system 106 learns and incrementally adjusts the global parameters by receiving modified parameter indicators from a subset of the client devices 112a-112n and adjusting the global parameters at the server(s) 102 based on the modified parameter indicators received in each training iteration.

As part of an initial training iteration, for instance, the asynchronous training system 106 initiates global parameters 202 for the global machine learning models 108. To initiate the global parameters 202, in some embodiments, the asynchronous training system 106 randomly selects or sets predetermined values for the global parameters 202. The asynchronous training system 106 subsequently sends, via the server(s) 102, the global parameters 202 to the client devices 112a-112n. For example, the asynchronous training system 106 may send a copy of the global parameters 202 to each of the client devices 112a-112n.

During the initial training iteration, the asynchronous training system 106 utilizes the client devices 112a and 112b to implement the global parameters 202 in the local machine learning models 116a and 116b to generate locally modified parameters based on client training data. As shown in FIG. 2, the client devices 112a-112n include client training data 208a-208n, respectively. In some embodiments, the client devices 112a and 112b apply the local machine learning models 116a and 116b (respectively) with the global parameters 202 to the client training data 208a and 208b (respectively) to generate locally modified parameters. Based on the locally modified parameters, the client devices 112a and 112b generate a set of modified parameter indicators 204a and 204b, respectively, and send the sets of modified parameter indicators 204a and 204b to the server(s) 102.

As FIG. 2 further illustrates, during the initial training iteration, only a subset of the client devices 112a-112n send the sets of modified parameter indicators 204a and 204b to the server(s) 102. Notably, the client device 112n either does not send a set of modified parameters indicators or sends its set of modified parameters only after the asynchronous training system 106 has received a threshold set of modified parameter indicators.

Moreover, as shown in FIG. 2, when sending the sets of modified parameter indicators 204a and 204b to the server(s) 102, the client devices 112a and 112b do not send the client training data 208a and 208b to the server(s) 102. By not sending the client training data 208a and 208b from the client devices 112a and 112b (or receiving the client training data at the server(s) 102), the asynchronous training system 106 preserves the client data privacy of the client devices 112a and 112b.

In response to receiving the sets of modified parameter indicators 204a and 204b, the asynchronous training system 106 generates, at the server(s) 102, adjusted global parameters. For example, in some embodiments, the asynchronous training system 106 determines that the client devices 112a and 112b include a threshold number of client devices (from among the client devices 112a-112n) to have generated modified parameter indicators. The two client devices 112a and 112b are merely an illustration. In some cases, a larger subset of any number of client devices from among the client devices 112a-112n may send modified parameter indicators to the server(s) 102 and satisfy the threshold number for a given training iteration.

Based on determining that the subset of client devices 112a and 112b satisfies this threshold number, the asynchronous training system 106 generates the adjusted global parameters. When generating the adjusted global parameters, in some implementations, the asynchronous training system 106 determines an average or weighted average of the sets of modified parameter indicators 204a and 204b and adjusts the global parameters 202 based on the average or weighted average. By making the adjustments to the global parameters 202, in some embodiments, the asynchronous training system 106 generates the adjusted global parameters.

During a subsequent training iteration, the asynchronous training system 106 iteratively applies the approach illustrated in FIG. 2. In particular, the asynchronous training system sends adjusted global parameters (e.g., the global parameters 202 adjusted for use in a subsequent iteration) to the client devices 112a-112n. The client devices 112a and 112b implement the adjusted global parameters 202 in the local machine learning models 116a and 116b during the subsequent training iteration. To the extent that the client device 112n also participates in the subsequent training iteration, the client device 112n likewise implements the adjusted global parameters 202 in the local machine learning models 116n.

During the subsequent training iteration, the client devices 112a and 112b implement the adjusted global parameters 202 in the local machine learning models 116a and 116b to again generate locally modified parameters based on the client training data 208a and 208b. In some such embodiments, the client devices 112a and 112b have altered, updated, or replaced the client training data 208a and 208b such that each of the client training data 208a and 208b represent a new client training dataset. Based on the locally modified parameters, the client devices 112a and 112b generate a new set of modified parameter indicators and send the new sets of modified parameter indicators to the server(s) 102.

In response to receiving the new sets of modified parameter indicators, the asynchronous training system 106 again generates adjusted global parameters. Continuing the subsequent training iteration, the asynchronous training system 106 further adjusts the global parameters based on the sets of modified parameter indicators. To initiate another training iteration, the asynchronous training system 106 sends the adjusted global parameters to the client devices 112a-112n for implementation in the local machine learning models 116a-116n.

In relation to FIG. 2, the asynchronous training system 106 continues to send adjusted global parameters, receive modified parameter indicators from a subset of the client devices 112a-112n, and further adjust the adjusted global parameters until a point of convergence. For instance, the asynchronous training system 106 may continue training iterations until adjustments to global parameters fall below a threshold value in a consecutive threshold number of training iterations (e.g., multiple training iterations of a weighted average of modified parameter indicators are within a threshold range of one another). Additionally, or alternatively, in some implementations, the asynchronous training system 106 continues training iterations until a certain time has passed or a certain number of training iterations have been performed.

While FIG. 2 illustrates the client devices 112a and 112b generating and sending the modified parameter indicators 204a-204b in multiple training iterations, in some embodiments, a different subset of the client devices 112a-112n generates and sends modified parameter indicators during different training iterations. Although not shown in FIG. 2, in some training iterations, the client device 112n generates a set of modified parameter indicators and sends the indicators to the server(s) 102 as part of the threshold number of client devices to send indicators for a training iteration. In such cases, the asynchronous training system 106 generates adjusted global parameters based on the set of modified parameter indicators from the client device 112n.

Figure 3A:
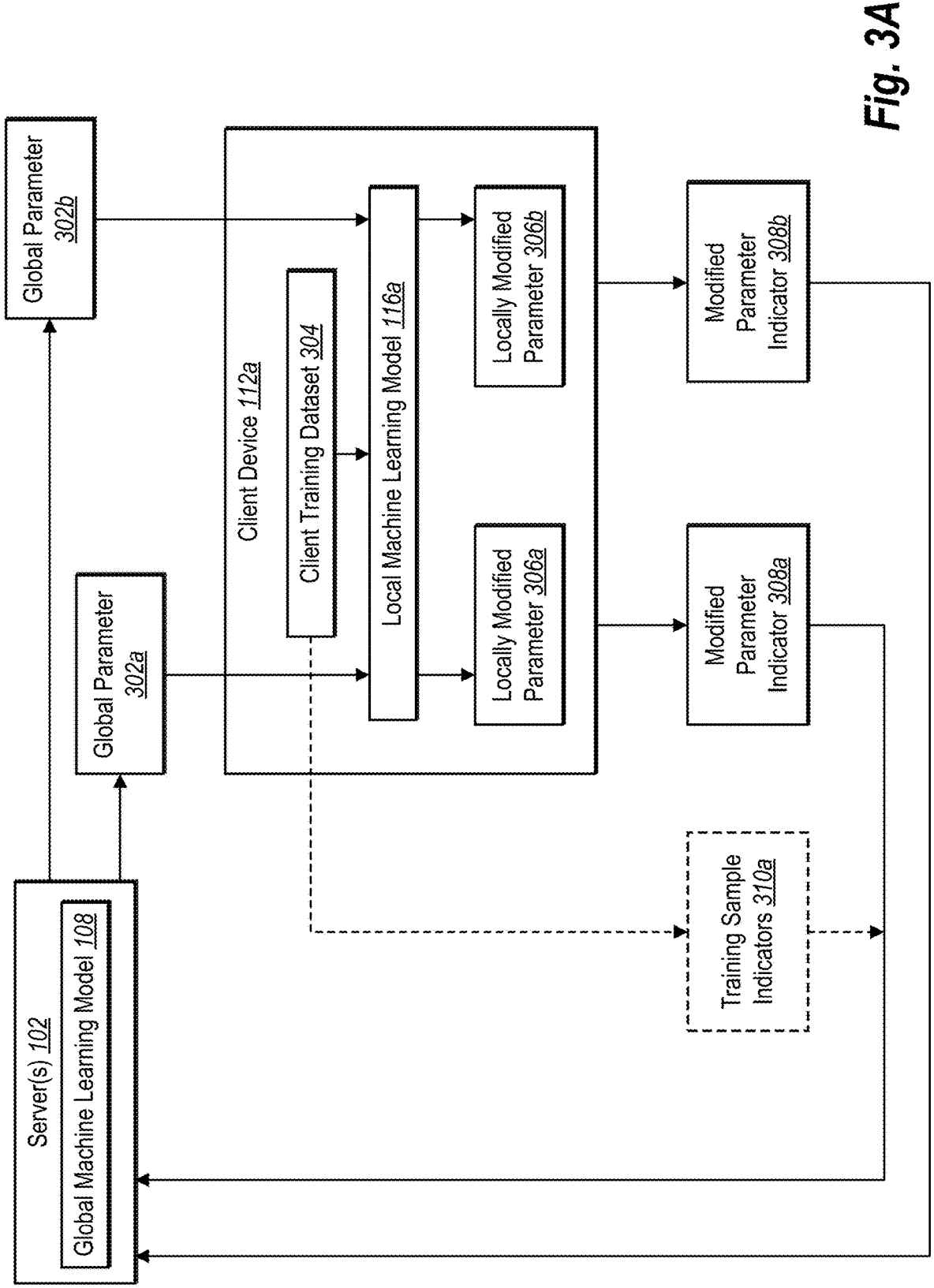
FIG. 3A illustrates a client device using a local machine learning model, global parameters, and client training data to generate locally modified parameters and send modified parameter indicators to an asynchronous training system in accordance with one or more embodiments.

FIG. 3A provides a further example of the asynchronous training system 106 utilizing a client device to generate locally modified parameters and send modified parameter indicators to a central server. In particular, FIG. 3A illustrates a training iteration in which the client device 112a receives global parameters 302a and 302b and implements the global parameters 302a and 302b in the local machine learning model 116a. By implementing the global parameters 302a and 302b, the asynchronous training system, via the client device 112a, generates locally modified parameters 306a and 306b (as modifications of the global parameters 302a and 302b) based on a client training dataset 304. The client training dataset 304 may be a dataset from client training data, such as the client training data 208a. The client device 112a further sends modified parameter indicators 308a and 308b corresponding to the locally modified parameters 306a and 306b, respectively, to the server(s) 102.

As shown in FIG. 3A, for example, the client device 112a receives the global parameters 302a and 302b from the server(s) 102 as part of a training iteration. As suggested above, in some embodiments, the global parameters 302a and 302b each represent different variables initiated or adjusted by the asynchronous training system 106, such as different weights or values for a neural network or regression model. Because the local machine learning model 116a corresponds to the global machine learning model 108, the global parameters 302a and 302b are compatible with the local machine learning model 116a.

For example, in some implementations, the client device 112a applies the global parameters 302a and 302b in the local machine learning model 116a to the client training dataset 304 to generate a predicted feature. The predicted feature corresponds to a goal or aim of the corresponding machine learning model. For example, for a machine learning model that seeks to predict a user action (e.g., whether the user will open a digital communication), the machine learning model can generate a prediction of the user action (e.g. predict whether a user opened a previous digital communication stored on the client device). The predicted features can vary widely based on the different aims of various machine learning model (e.g., classify a communication as spam, determine effectiveness of a digital communication, or identify a person portrayed in a digital image).

After generating a predicted feature, the client device 112a compares the predicted feature to a ground-truth feature (from the client training data) that corresponds to the predicted feature. The ground-truth feature can reflect a reference point for the predicted feature. For example, for a predicted feature of a user action, a ground truth would include whether the user engaged in the user action (e.g., whether the user actually opened the previous digital communication stored on the client device). The ground truth can also vary based on the aims of various machine learning models (e.g., whether a communication actually was spam, whether a digital communication resulted in a conversion, or the actual identity of a person in a digital image).

In some such embodiments, the client training dataset 304 represents a dataset from larger client training data, such as from the client training data 208a. Accordingly, both the client training dataset 304 and the ground-truth feature may represent different data within the client training data 208a. In either case, both the client training dataset 304 and the ground-truth feature are generated, stored, or received by the client device 112a.

Based on a comparison between the predicted feature and the ground-truth feature, the client device 112a modifies each of the global parameters 302a and 302b to generate the locally modified parameters 306a and 306b. As just suggested, the global parameters 302a and 302b correspond to the locally modified parameters 306a and 306b, respectively. In some implementations, the client device 112a increases or decreases values representing the global parameters 302a and 302b to generate the locally modified parameters 306a and 306b.

To illustrate, when the global machine learning model is a neural network, a client device can modify internal weighting parameters of a local version of the neural network at the client device. Specifically, the client device can apply the local neural network using global parameters to training model input data at the client device to generate a predicted feature. The client device can determine a measure of loss (utilizing a loss function) between the predicted feature generated by the local neural network and a ground-truth feature at the client device. The client device can further back-propagate the measure of loss to layers of the local neural network to generate modified internal weighting parameters for the layers of the local neural network. The client device can then provide these modified internal weighting parameters as modified parameter indicators.

Indeed, as further shown in FIG. 3A, the client device 112a generates and sends the modified parameter indicators 308a and 308b to the server(s) 102 based on the locally modified parameters 306a and 306b. To generate such indicators, in certain embodiments, the client device 112a determines a first difference between the locally modified parameter 306a and the global parameter 302a and a second difference between the locally modified parameter 306b and the global parameter 302b. The client device 112a subsequently generates a first parameter update differential (as the modified parameter indicator 308a) representing the first difference and a second parameter update differential (as the modified parameter indicator 308b) representing the second difference. By contrast, in certain embodiments, the client device 112a uses the locally modified parameters 306a and 306b themselves as the modified parameter indicators 308a and 308b, respectively, and sends the locally modified parameters 306a and 306b to the server(s) 102.

In addition to generating the modified parameter indicators 308a and 308b, the client device 112a optionally generates training sample indicators 310a. The term "training sample indicator" refers to a value or a characteristic of a client training dataset corresponding to a particular client device. For example, the training sample indicators 310a may include a number of training samples or a number of features corresponding to individual training samples.

To explain, modified parameter indicators in isolation may not indicate the quantity or quality of training data at any respective client device. The accuracy and/or reliability of modified parameter indicators from individual client devices, however, can vary based on the amount of training samples at each client device and the number of features corresponding to the training samples. Accordingly, in some embodiments, the asynchronous training system 106 can identify and provide training sample indicators to more accurately weight modified parameter indicators from individual client devices.

For example, in some cases, the number of training samples may be represented as a fraction of total training samples within a given training iteration. Moreover, the number of features may be represented by the number (or percentage) of samples where a particular feature is represented. Accordingly, in some embodiments, the client device 112a generates and sends a number of training samples within the client training dataset 304 (and/or a number of features corresponding to individual training samples) to the server(s) 102.

To illustrate, consider a machine learning model that predicts whether emails are spam. The asynchronous training system 106 can use training sample indicators that reflect a number of emails utilized to train the machine learning model at the client device (i.e., the number of samples). Similarly, the asynchronous training system 106 can utilize training sample indicators that reflect a number of features for the emails (e.g., whether each sample includes a subject line, a time sent, a time received, an attachment, an image, a sender, a recipient, a previous email time sent, a subsequent email time sent, or other specific features). In some embodiments, the number of features may be represented as a vector comprising a series of fractions indicating whether individual training samples include a non-zero value corresponding to certain features. As discussed, the asynchronous training system 106 can weight modified parameter indicators reflecting a greater number of samples and/or a greater number of features.

The asynchronous training system 106 can utilize a variety of additional characteristics as training sample indicators to weight modified parameter indicators. For example, the asynchronous training system 106 can also utilize sample times, geographic location, or a number of iterations run at a client device as training sample indicators (e.g., in circumstances where such characteristics have a bearing on the accuracy or reliability of modified parameter indicators).

As further indicated by FIG. 3A, in some such embodiments, the client device 112a sends the training sample indicators 310a and/or the modified parameter indicators 308a and 308b to the server(s) 102. After receiving the modified parameter indicators 308a and 308b, the asynchronous training system 106 adjusts the global parameters 302a and 302b based on the modified parameter indicators 308a and 308b, respectively. As explained further below, in some cases, the asynchronous training system 106 assigns a weight to the modified parameter indicators 308a and 308b based on the training sample indicators 310a.

Figure 3B:
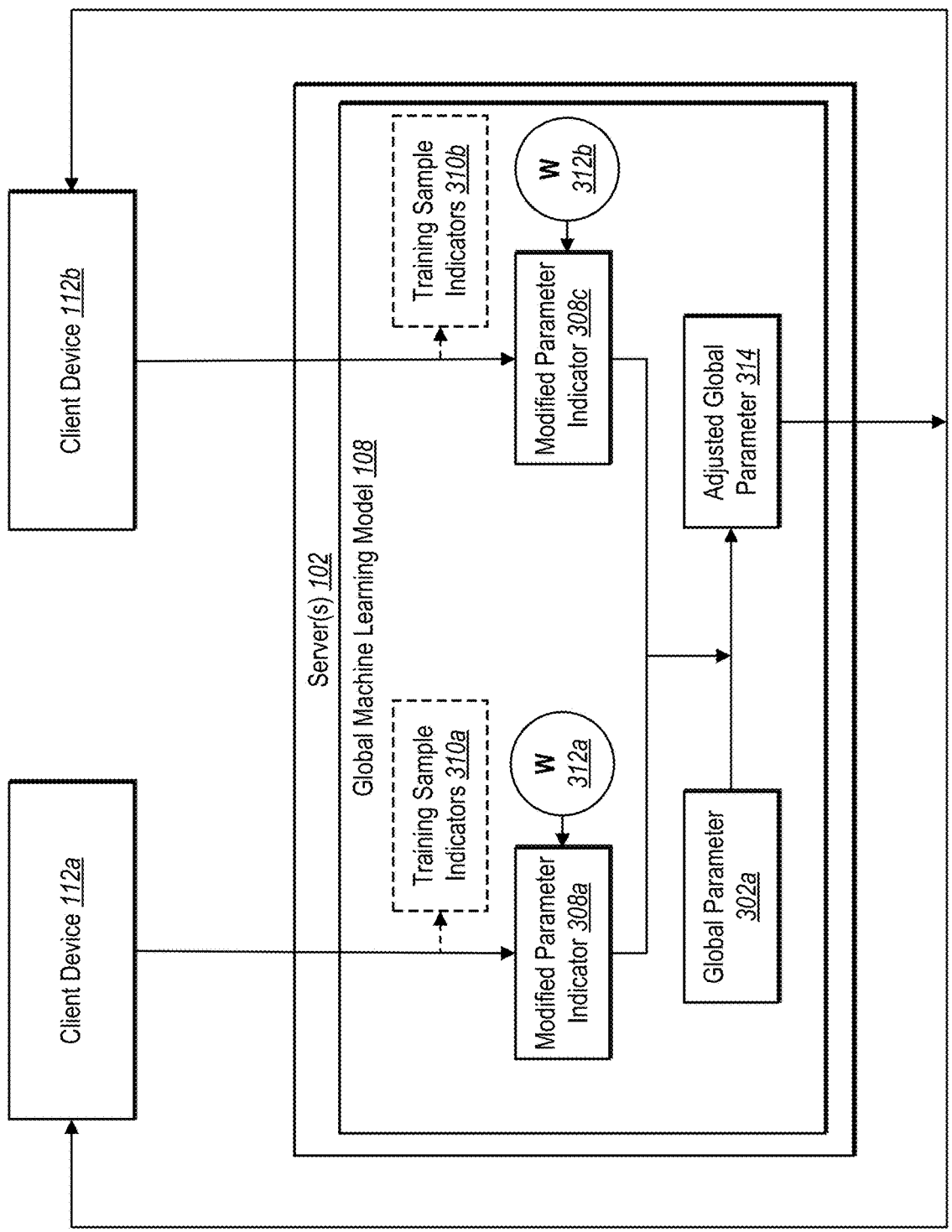
FIG. 3B illustrates an asynchronous training system generating an adjusted global parameter based on modified parameter indicators from client devices in accordance with one or more embodiments.

For example, FIG. 3B depicts the asynchronous training system 106, via the server(s) 102, generating an adjusted global parameter based on modified parameter indicators from the client device 112a in accordance with one or more embodiments. In particular, FIG. 3B illustrates the asynchronous training system 106 receiving modified parameter indicators 308a and 308c from the client devices 112a and 112b, respectively. Based on the modified parameter indicators 308a and 308c, the asynchronous training system 106 adjusts, via the server(s) 102, the global parameter 302a to generate adjusted global parameter 314. The asynchronous training system 106 subsequently provides the adjusted global parameter 314 to the client devices 112a and 112b and any other client devices the asynchronous training system 106 continues to use for adjusting global parameters.

As shown in FIG. 3B, the asynchronous training system 106, via the server(s) 102, receives the modified parameter indicator 308a from the client device 112a and the modified parameter indicator 308c from the client device 112b. As FIGS. 3A and 3B suggest, both the modified parameter indicators 308a and 308b correspond to the global parameter 302a. For example, in some embodiments, the modified parameter indicators 308a and 308b each comprise a parameter update differential representing a difference between a locally modified parameter and the global parameter 302a. In addition to receiving the modified parameter indicators 308a and 308b, the asynchronous training system 106 also optionally receives training sample indicators 310a and 310b from the client devices 112a and 112b, respectively.

As further shown in FIG. 3B, in response to receiving the modified parameter indicators 308a and 308b, the asynchronous training system 106 adjusts the global parameter 302a to generate the adjusted global parameter 314. In some such embodiments, the asynchronous training system 106 determines that the subset of client devices 112a and 112b includes a threshold number of client devices (from among the client devices 112a-112n) to have generated modified parameter indicators for a particular training iteration. Based on determining that the subset of client devices 112a and 112b satisfies the threshold number, the asynchronous training system 106 proceeds to determine any adjustments for the global parameter 302a. As suggested above, in certain embodiments, the asynchronous training system 106 may receive additional modified parameter indicators from additional client devices from among the client devices 112a-112n before determining that the modified parameter indicators satisfy a threshold number of training devices for a training iteration.

In some implementations, the asynchronous training system 106 adjusts the global parameter 302a based on an average or weighted average of the modified parameter indicators 308a and 308b. Accordingly, in certain embodiments, the asynchronous training system 106 determines a weight 312a for the modified parameter indicator 308a and a weight 312b for the modified parameter indicator 308c. In some such embodiments, the asynchronous training system 106 determines the weights 312a and 312b based on the training sample indicators 310a corresponding to the modified parameter indicators 308a and 308c, respectively.

For example, as indicated in FIG. 3B, the asynchronous training system 106 determines the weights 312a and 312b for the modified parameter indicators 308a and 308c, respectively, based on the number of training samples from the client device 112a (for the modified parameter indicator 308a) and a number of training samples from the client device 112b (for the modified parameter indicator 308c). In some such implementations, the asynchronous training system 106 determines the weights 312a and 312b proportional to (or as a fraction of) a number of training samples indicated by the training sample indicators 310a and 310b. Additionally, or alternatively, the asynchronous training system 106 determines the weights 312a and 312b proportional to (or as a fraction of) a number of features. As suggested above, in alternative embodiments, training sample indicators may include other weighting characteristics, such as a time or geographic location.

As further indicated by FIG. 3B, the asynchronous training system 106 determines a weighted average of the modified parameter indicators 308a and 308c based on the weights 312a and 312b. For instance, the asynchronous training system 106 may determine a weighted average of a first parameter update differential (as the modified parameter indicator 308a), a second parameter update differential (as the modified parameter indicator 308c), and any additional parameter update differentials received from additional client devices. Based on the weighted average, the asynchronous training system 106 further adjusts the global parameter 302a to generate the adjusted global parameter 314. For example, the asynchronous training system 106 may increase or decrease a value representing the global parameter 302a according to the weighted average.

As noted above, in the alternative to receiving parameter update differentials, the asynchronous training system 106 can receive locally modified parameters as the modified parameter indicators 308a and 308c from the client devices 112a and 112b. Such modified parameter indicators may represent adjusted versions of the global parameter 302a. In some embodiments, the asynchronous training system 106 determines an average or weighted average of the locally modified parameters, where the weighted average is based on weights, such as the weights 312a and 312b. To generate the adjusted global parameter 314, in certain implementations, the asynchronous training system 106 adjusts the global parameter 302a by an average or weighted average of parameter update differentials for a particular training iteration or replaces the global parameter 302a to match an average or weighted average of the locally modified parameters.

Regardless of how the asynchronous training system 106 generates the adjusted global parameter 314, as further shown in FIG. 3B, the asynchronous training system 106 sends the adjusted global parameter 314 to the client devices 112a and 112b—as well as any additional client devices from among the client devices 112a-112n the asynchronous training system 106 continues to use for adjusting global parameters. As part of a subsequent training iteration, the client devices 112a and 112b proceed to implement the adjusted global parameter 314 in their respective local machine learning models 116a and 116b. Although FIG. 3B depicts the asynchronous training system 106 sending one adjusted global parameter to client devices, in some embodiments, the asynchronous training system 106 generates and sends multiple adjusted global parameters to the client devices 112a-112n—depending on the number of global parameters corresponding to the global machine learning model 108.

As also noted above, in some embodiments, the asynchronous training system 106 tallies or tracks the number of training iterations in which a client device sends modified parameter indicators and applies a bounded delay approach to include a broad range of client devices without unduly slowing the training process.

Figure 4:
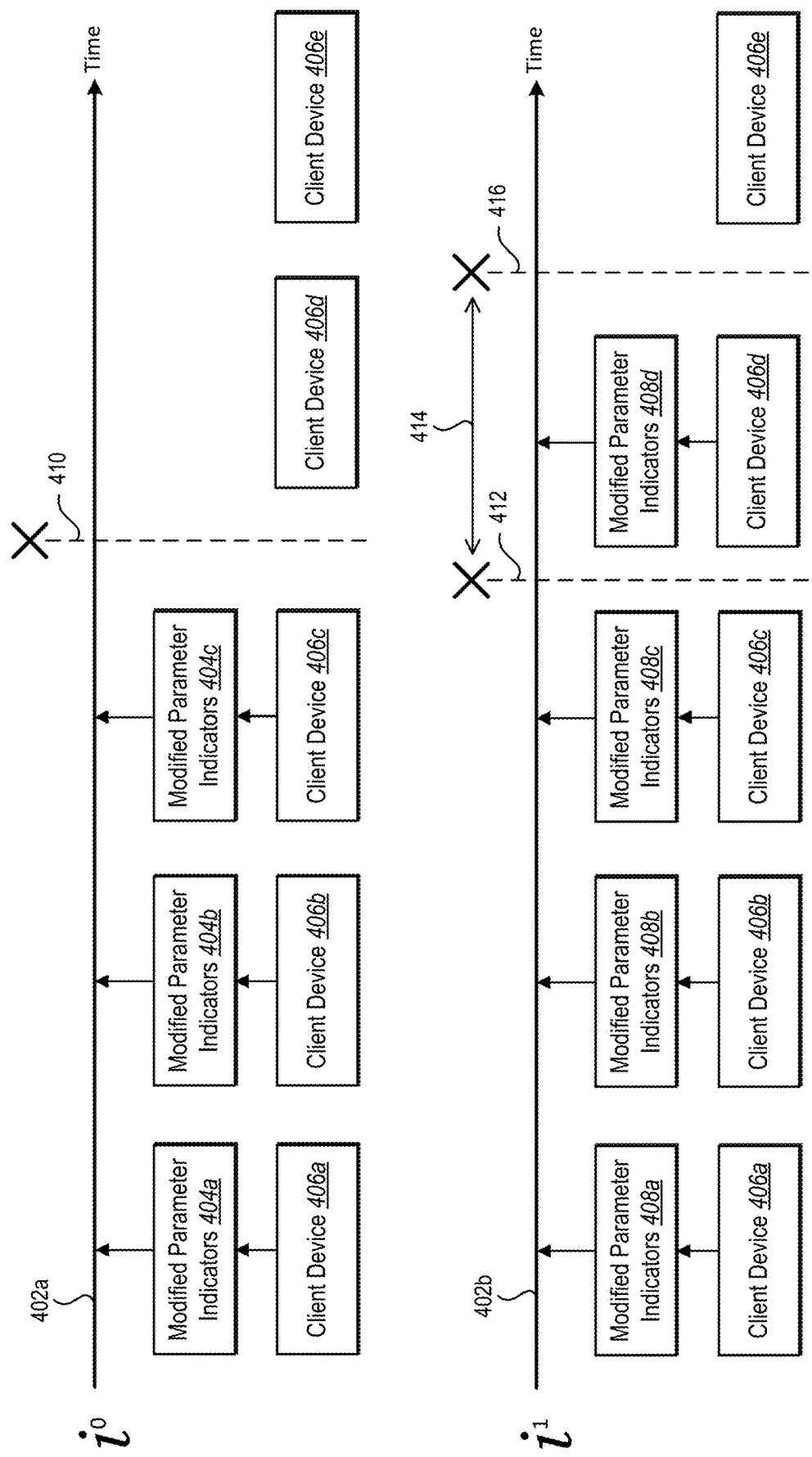
FIG. 4 illustrates a timeline of training iterations for an asynchronous training system to train a global machine learning model based on modified parameter indicators received from client devices in accordance with one or more embodiments.

To illustrate, FIG. 4 provides an example of the asynchronous training system 106 applying a bounded delay approach for asynchronously training a global parameter utilizing a subset of client devices. In particular, FIG. 4 illustrates a first timeline 402a for an initial training iteration and a second timeline 402b for a subsequent training iteration in accordance with one or more embodiments. As indicated by the first timeline 402a and the second timeline 402b, the asynchronous training system 106 delays completion of a training iteration until receiving modified parameter indicators from certain client devices. In particular, upon detecting that one or more client devices have not sent a set of modified parameter indicators to the server(s) 102 in a threshold number of training iterations, the asynchronous training system 106 waits (e.g., waits a threshold time) for the one or more client devices to respond. In this manner, the asynchronous training system 106 can ensure that slower client devices are not excluded from providing modified parameter indicators (and thus skew training of the global machine learning model) while also avoiding undue delays and increased training time.

As indicated by the first timeline 402a for the initial training iteration, the asynchronous training system 106 receives modified-parameter-indicator sets 404a, 404b, and 404c from client devices 406a, 406b, and 406c by a first time 410. But the asynchronous training system 106 does not receive modified-parameter-indicator sets from client devices 406d and 406e. In particular, by the first time 410, the asynchronous training system 106 determines that the client devices 406a-406c satisfy a threshold number of client devices to have generated modified parameter indicators and constitute a satisfactory subset of client devices for the initial training iteration. Accordingly, in response to receiving the indicator sets at the first time 410, the asynchronous training system 106 generates adjusted global parameters based on the modified-parameter-indicator sets 404a, 404b, and 404c during the initial training iteration. The adjusted global parameters for the initial training iteration are not based on any modified parameter indicators from the client devices 406d and 406e.

During the subsequent training iteration, the asynchronous training system 106 identifies, at the second time 412, that the threshold number of client devices has been satisfied. The asynchronous training system 106 also determines that the client devices 406d and 406e have not sent sets of modified parameter indicators in a threshold number of training iterations. The threshold number may be any number of training iterations, including, but not limited to, five, ten, twenty, or fifty training iterations.

Upon determining that the client devices 406d and 406e have reached the threshold number of training iterations without sending sets of modified parameter indicators, the asynchronous training system 106 imposes a bounded delay condition and waits for modified parameter indicators from the client devices 406d and 406e. In particular, the asynchronous training system 106 waits for modified parameter indicators from the client devices 406d and 406e subject to a threshold time 414. Indeed, even though the threshold number of client devices was satisfied for this training iteration by the second time 412, the asynchronous training system 106 continues to wait because the client devices 406d and 406e have not provided modified parameter indicators within a threshold number of training iterations. In one or more embodiments, the asynchronous training system 106 waits up to the threshold time 414 for the client devices 406d and 406e to provide modified parameter indicators.

As indicated by the second timeline 402b for the subsequent training iteration, the asynchronous training system 106 waits the threshold time 414. The threshold time may be any timeframe, including, but not limited to, thirty seconds, five minutes, or one hour. Prior to expiration of the threshold time 414, the asynchronous training system 106 receives modified parameter indicators 408d from the client device 406d. Accordingly, the asynchronous training system 106 adds the modified parameter indicators 408d to the modified parameter indicators 408a-408c and generates adjusted global parameters based on the modified-parameter-indicator sets 408a-408d.

As further indicated by the second timeline 402b, however, the client device 406e does not send a modified-parameter-indicator set to the server(s) 102 within the threshold time 414. In response to determining that the client device 406e has not provided modified parameter indicators within the threshold time 414, in some embodiments, the asynchronous training system 106 closes the training iteration (i.e., at the third time 416).

In addition, in one or more embodiments, the asynchronous training system 106 also removes the client device 406e from the group of client devices that the asynchronous training system 106 uses for adjusting global parameters. By removing the client device 406e or other similarly situated client devices, the asynchronous training system 106 ensures that unresponsive client devices do not slow or obstruct the asynchronous training of a machine learning model across client devices.

In one or more embodiments, the asynchronous training system 106 also sends a specific request for modified parameter indicators to client devices. For example, at the beginning of the second iteration or at the second time 412, the asynchronous training system 106 can send a request for modified parameter indicators to the client devices 406a-406e or to merely the client devices 406d and 406e. If the client devices 406d and 406e subsequently send modified-parameter-indicator sets after the threshold time 412 has elapsed, the asynchronous training system 106 uses their modified-parameter-indicator sets to update global parameters for that particular training iteration. If the client devices 406d and 406e do not send modified-parameter-indicator sets after the threshold time 412 has elapsed, in some cases, the asynchronous training system 106 removes the client device from the group of client devices that the asynchronous training system 106 uses for adjusting global parameters.

Figure 5:
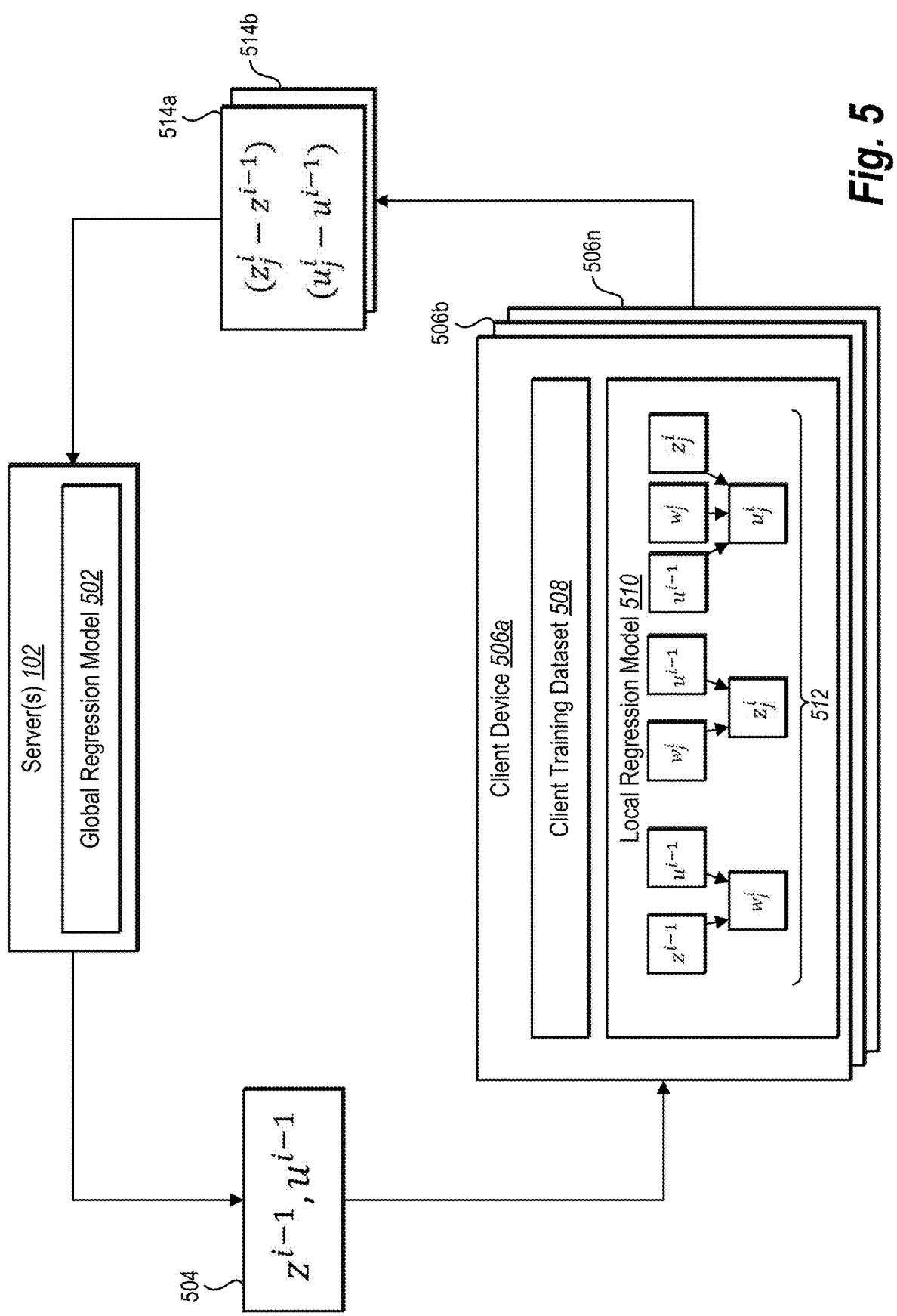
FIG. 5 illustrates a flow diagram of an asynchronous training system training a regression model across client devices in accordance with one or more embodiments.

As noted above, in certain embodiments, the global machine learning model 108 and the local machine learning models 116a-116n respectively constitute a global regression model and local regression models. FIG. 5 illustrates an example of the asynchronous training system 106 training a regression model across client devices in accordance with one or more embodiments. As part of the training, the asynchronous training system 106 sends global parameters for a global regression model 502 to client devices 506a-506n that use local regression models to generate modified parameter indicators. The following paragraphs describe how the asynchronous training system 106, in certain embodiments, uses the global regression model 502 and corresponding local regression models based on the framework.

For example, consider the following optimization equation:

$$\min_{x,z} f(x) + g(z) \qquad (1)$$
$$\text{s.t. } Px + Qz = r$$

In equation (1), f and g both represent scalar valued functions. Additionally, P, Q, and r each represent matrix constants (or vector constants) describing an instance of the optimization equation (1), where $P \in \mathbb{R}^{p \times s}$, $Q \in \mathbb{R}^{p \times t}$, and $r \in \mathbb{R}^p$. By contrast, x and z both represent optimization parameters, where $x \in \mathbb{R}^s$ and $z \in \mathbb{R}^t$.

Equation (1) can be reformulated into an $l_1$-norm regularized linear regression equation. For instance:

$$\min_w \frac{1}{2} \|b - Aw\|_2^2 + \lambda \|w\|_1 \qquad (2)$$

In equation (2), A represents an input data matrix for n training samples that include (or are represented by) m features, where $A \in \mathbb{R}^{n \times m}$. Additionally, b represents a response vector for all n training samples within the A input data matrix, where $b \in \mathbb{R}^n$. As further shown in equation (2), w represents a parameter vector estimated by equation (2), where $w \in \mathbb{R}^m$; λ represents a regularization parameter that controls for feature selection, where λ>0; and $\|\bullet\|_1$ and $\|\bullet\|_2$ respectively denote the $l_1$-norm and $l_2$-norm functions. While equation (2) may not appear to resemble equation (1) at first glance, equation (2) is nevertheless an instance of equation (1). As indicated below by equation (5), equation (1) may be reformulated into equation (2) by setting r=O and P=−Q=I, where the symbol O represents an all-zero vector and the symbol I represents the identity matrix.

An optimization equation, such as equation (1) can be solved using various algorithmic techniques, such as Stochastic Gradient Descent, Adaptive Gradient Algorithm ("AdaGrad"), Adaptive Moment Estimation ("Adam"), or Alternating Direction Method of Multipliers ("ADMM"). ADMM is particularly well-suited for large-sized and complex datasets. As described further below, in certain embodiments, the asynchronous training system 106 employs a unique algorithmic technique based on ADMM to solve a variation of equation (1).

In some cases, ADMM represents a decomposition-coordination procedure in which the algorithm coordinates solutions to local problems to find a solution to a global problem. Accordingly, ADMM can be viewed as an attempt to blend the benefits of dual decomposition and augmented Lagrangian methods for constrained optimization. For example, equation (1) can be converted into the following augmented Lagrangian form:

$$L_p(x, z, u) = f(x) + g(z) + u^T(Px + Qz - r) + \frac{\rho}{2}\|Px + Qz - r\|_2^2 \qquad (3)$$

In equation (3), u represents a dual parameter, and p represents a penalty parameter, where $u \in \mathbb{R}^p$ and p>0. Similar to some of the equations above, x and z represent optimization parameters. In implementing equation (3), ADMM iteratively minimizes the loss $L_p(x, z, u)$ with respect to x and z. By reformulating equation (1), equation (3) replaces the hard constraint of Px+Qz=r from equation (1) with a softer quadratic penalty of (Px+Qz−r) in equation (3). The softer quadratic penalty enables ADMM to (i) find an approximate solution faster than equation (1) with its hard constraint and (ii) reduce the overall time needed to compute an optimal solution.

When implementing ADMM, the following steps in the (i+1)$^{th}$ iteration of ADMM can be performed to update each of the optimization parameters x and z and the dual parameter u:

$$x^{i+1} \leftarrow \arg\min_x L_p(x, z^i, u^i) \qquad (4a)$$

$$z^{i+1} \leftarrow \arg\min_z L_p(x^{i+1}, z, u^i) \qquad (4b)$$

$$u^{i+1} \leftarrow u^i \rho(Px^{i+1} + Qz^{i+1} - r) \qquad (4c)$$

As shown in equation (4a), the machine learning system determines $x^{i+1}$ for a subsequent training iteration based on values for a previous iteration of z and u (e.g., by holding $z^i$ and $u^i$ constant). As shown in equation (4b), the machine learning system determines $z^{i+1}$ for the subsequent training iteration based on $x^{i+1}$ (e.g., by holding $x^{i+1}$ and $u^i$ constant). As shown in equation (4c), the machine learning system then determines $u^{i+1}$ for the subsequent training iteration based on $x^{i+1}$ and $z^{i+1}$ (e.g., holding $x^{i+1}$ and $z^{i+1}$ constant).

As mentioned previously, sometimes data points are distributed across devices, and the distribution cannot be controlled or allocated by a single entity. For example, this scenario may arise when client devices that previously shared client data disconnect from a network, change client-data-privacy settings to prevent sharing client data, or suffer from a software or hardware malfunction. To solve equation (2) in such circumstances, this disclosure proposes that machine learning systems take a distributed approach by using a federation of client devices that execute a local machine learning model to solve equation (2) without sending client training data to a central server.

For instance, consider that data resides in K devices. Equation (2) can be reformulated as follows:

$$\min_w \frac{1}{2} \sum_{k=1}^{K} l_k(w) + \lambda \|w\|_1 \qquad (5)$$

In equation (5), $l_k(w) = \|b_k - A_k w\|_2^2$, where $A_k$ and $b_k$ each represent client training data on the $k^{th}$ client device, and K represents the group of client devices on which the client training data resides. In particular, $A_k$ represents an input data matrix for n training samples that include (or are represented by) m features for the $k^{th}$ client, and $b_k$ represents a response vector for all n training samples within the $A_k$ input data matrix for the $k^{th}$ client device. As equation (5) indicates and as noted above, equation (1) may be reformulated into equation (2) by setting r=O and P=−Q=I, where the symbol O represents an all-zero vector and the symbol I represents the identity matrix.

While equation (5) may work well for a central server that receives client training data, ADMM can be modified to work across client devices in a unique federated set up or federated ADMM ("FADMM"). Specifically, this FADMM approach can be achieved by expressing equation (5) as:

$$\min_{w,z} \frac{1}{2} \sum_{k=1}^{K} l_k(w) + \lambda \|z\|_1 \quad (6)$$
$$\text{s.t.} \quad w - z = 0$$

and by writing its augmented Lagrangian form as:

$$L_\rho(w, z, u) = \frac{1}{2} \sum_{k=1}^{K} l_k(w) + \lambda \|z\|_1 + u^T(w - z) + \frac{\rho}{2} \|w - z\|_2^2 \quad (7)$$

In both equations (6) and (7), z represents a dummy parameter intended to approximate w at convergence, where $z \in \mathbb{R}^m$. As a dual parameter, u constrains w to approximately equal z at convergence. By relaxing equation (5)'s constraint on w to exactly equal z, equations (6) and (7) reduce the time and number of training iterations required to reach convergence.

In the federated approach from equations (6) and (7), the $k^{th}$ client device does not perform any of the functions $l_{k'}(w)$ for $k' \in \{1, \ldots\}/\{k\}$. Accordingly, in some implementations, the optimization problem that is local to the $k^{th}$ client device is:

$$\min_{w,z} \frac{1}{2} \sum_{k=1}^{K} l_k(w) + \lambda \|z\|_1 \quad (8)$$
$$\text{s.t.} \quad w - z = 0$$

and its augmented Lagrangian is given by:

$$L_{\rho,k}(w, z, u) = \frac{1}{2} \sum_{k=1}^{K} l_k(w) + \lambda \|z\|_1 + u^T(w - z) + \frac{\rho}{2} \|w - z\|_2^2 \quad (9)$$

Equations (8) and (9) represent local versions of equations (6) and (7) for client devices. As discussed further below, in some embodiments of the asynchronous training system 106, a client device locally solves equation (8) by using equation (9).

When implementing FADMM with equations (6) or (7), a central server can run many training iterations by communicating with the group of K client devices until satisfying the convergence criteria of equation (6)—that is, until the value of optimization parameters do not change significantly across training iterations. While the FADMM approach solves some of the problems with client devices unable or unavailable to send client training data, client devices may also have variable network and computing capabilities that affect a particular client device's ability to solve equations (6) or (7) using local regression models. In addition to network disconnections, changes in client-data-privacy settings, and device malfunctions, varying network and computing capabilities may slow down a training iteration to perform only as fast as the slowest client device or halt a training iteration altogether. To avoid such training iteration slowdowns or obstructions, in some embodiments, the asynchronous training system 106 uses a partial barrier that relaxes a requirement for a group of K client devices to send modified parameter indicators in each training iteration.

As suggested above, in certain embodiments, the asynchronous training system 106 generates adjusted global parameters for a global machine learning model after receiving modified parameter indicators from a threshold number of client devices S, where S≤K. As shown in FIG. 5, the asynchronous training system 106 uses an asynchronous federated ADMM ("AFADMM") approach to training a machine learning model across client devices. In particular, the asynchronous training system 106 sends global parameters 504 for the global regression model 502 to client devices 506a-506n. After receiving the global parameters 504, client devices 506a and 506b—which comprise a subset of client devices from among the client devices 506a-506n—implement the global parameters 504 in local regression models to generate locally modified parameters and solve equation (8). Based on the locally modified parameters, the client devices 506a and 506b respectively send modified-parameter-indicator sets 514a and 514b to the server(s) 102. For purposes of illustration, the following paragraphs describe the actions of client device 506a as representative of a subset of client devices that send modified parameter indicators.

As indicated in FIG. 5, in some embodiments, when implementing the AFADMM, the asynchronous training system 106 implements pseudocode via a server device (e.g., the server(s) 102) for an Algorithm 1 shown in Table 1 below:

TABLE 1

Algorithm 1 AFADMM pseudo-code: Server Side

Definitions: $\phi^i$ is a subset of client devices that participate in the $i^{th}$ training iteration s.t. $|\phi^i| \geq S$. $T \in \mathbb{Z}^K$ holds the number of training iterations for which parameter update differentials from each client device have not been considered.

1: Initialize $z^0$ and $u^0$
2: for each iteration i = 1, 2, 3, . . . do
3:     Send $z^{i-1}$ and $u^{i-1}$ to all K client devices
4:     $\phi^i \leftarrow$ First S client devices that send updates TABLE 1-continued Algorithm 1 AFADMM pseudo-code: Server Side 5:   Wait for parameter update differentials from all client devices j ∈ {1, . . . , K} for which T[j] ≥ τ and add these client devices to $\phi^i$ 6:   $z^i \leftarrow z^{i-1} = \sum_{j \in \phi^i} \frac{n_j}{n} h_j \odot (z_j^i - z^{i-1})$ ▷ Update Global Parameter z 7:   $u^i \leftarrow u^{i-1} = \sum_{j \in \phi^i} \frac{n_j}{n} h_j \odot (u_j^i - u^{i-1})$ ▷ Update Global Parameter u 8:   for each client device j ∈ $\phi^i$ do
9:      T[j] ← 1
10:  for each client device j ∉ $\phi^i$ do
11:     T[j] ← T[j] + 1

Similarly, in some embodiments, when implementing the AFADMM, the asynchronous training system 106 implements a pseudocode via the client device 506a for an Algorithm 2 shown in Table 2 below:

TABLE 2

Algorithm 2 AFADMM pseudo-code: For Client Device j ∈ {1, . . . , K}

1:   Receive global parameters $z^{i-1}$ and $u^{i-1}$ from server
2:   $w_j^i \leftarrow (A_j^T A_j + \rho I)^{-1}(A_j^T b_j + \rho z^{i-1} - u^{i-1})$ 3:   $z_j^i \leftarrow S_{\frac{\lambda}{\rho}}\left(w_j^i + \frac{1}{\rho}u^{i-1}\right)$ 4:   $u_j^i \leftarrow u^{i-1} + \rho(w_j^i - z_j^i)$
5:   Send parameter update differentials $(z_j^i - z^{i-1})$ and $(u_j^i - u^{i-1})$ along with scaling vector $h_j \in \mathbb{R}^m$, and a non-negative integer $n_j$ to the server As indicated by Algorithm 1, Steps 1-3, from Table 1, the asynchronous training system 106 stores global parameters z and u on a server device and shares the global parameters z and u across all client devices K. At the start of each training iteration i, the asynchronous training system 106 sends global parameters $z^{i-1}$ and $u^{i-1}$ to each client device to ensure that each device receives the latest global parameters corresponding to the global regression model 502.

As indicated by Step 3 of Algorithm 1 and as shown in FIG. 5, the asynchronous training system 106 sends the global parameters 504 to the client devices 506a-506n. In some embodiments, the asynchronous training system 106 sends a copy of the global parameter $z^{i-1}$ and the global parameter $u^{i-1}$ to each of the client devices 506a-506n. As suggested above, the asynchronous training system 106 does not need to send a global parameter $w^{i-1}$ to client devices because global parameter z approximates global parameter w at convergence.

After receiving the global parameters $z^{i-1}$ and the client devices 506a and 506b perform Algorithm 2. For example, as indicated by Algorithm 2, Steps 1-4, from Table 2, the client device 506a begins each training iteration with the latest global parameter values received from the server(s) 102. As indicated by FIG. 5, the client device 506a generates locally modified parameters 504 in a local regression model 510 by solving equation (8) with respect to its local client training data. In particular, upon receiving a request for updates from the server(s) 102, the client device 506a initiates an ADMM routine to locally solve equation (8) and update local parameters $w_j$, $z_j$, and $u_j$ according to Algorithm 2. By solving equation (8), the jth client device (e.g., the client device 506a) attempts to ensure that w≈z at convergence.

As further shown in FIG. 5, the locally modified parameters 512 include a locally modified parameter $w_j^i$, a locally modified parameter $z_j^i$, and a locally modified parameter $u_j^i$, where j represents a client device (e.g., the client device 506a). The client device 506a generates the locally modified parameter $w_j^i$ based on the global parameters $z^{i-1}$ and $u^{i-1}$ and client training dataset 508. In certain embodiments, the client training dataset 508 includes $A_j$ and $b_j$. The client device 506a further generates the locally modified parameter $z_j^i$ based on the locally modified parameter $w_j^i$ and the global parameter $u^{i-1}$. Moreover, the client device 112a generates the locally modified parameter $u_j^i$ based on the global parameter $u^{i-1}$, the locally modified parameter $w_j^i$, and the locally modified parameter $z_j^i$.

In particular, in some embodiments, the client device 506a generates the locally modified parameters $w_j^i$, $z_j^i$, and $u_j^i$ according to Steps 2-4 of Algorithm 2 from Table 2. In Steps 2-4, I represents the identity matrix, and $S_\gamma(\cdot)$ represents the soft-thresholding operator defined element-wise by the following equation:

$$S_\gamma(y) = \begin{cases} y - \gamma & y > \gamma \\ y + \gamma & y < -\gamma \\ 0, & \text{otherwise} \end{cases} \quad (10)$$

In equation (10), $S_\gamma(\cdot)$ may be applied to any scalar y, where y ∈ ℝ.

As further shown in FIG. 5, the client device 506a generates the modified-parameter-indicator set 514a based on the locally modified parameters 512 and sends the modified-parameter-indicator set 514a to the server(s) 102. The modified-parameter-indicator set 514a includes two different parameter update differentials—a parameter update differential $(z_j^i - z^{i-1})$ and a parameter update differential $(u_j^i - u^{i-1})$. The parameter update differentials $(z_j^i - z^{i-1})$ and $(u_j^i - u^{i-1})$ each represent a difference between a locally modified parameter and a global parameter. Similarly, the modified-parameter-indicator set 514b corresponding to the client device 506b likewise includes two different parameter update differentials. Although the asynchronous training system 106 may use locally modified parameters as modified parameter indicators, the following paragraphs often refer to the modified-parameter-indicator sets 514a and 514b as parameter update differentials.

As further indicated by Algorithm 2, Step 5, from Table 2, the client device 506a sends parameter update differentials $(z_j^i - z^{i-1})$ and $(u_j^i - u^{i-1})$ to the server(s) 102 together with a scaling vector $h_j$ and a non-negative integer $n_j$, where $h_j \in \mathbb{R}^m$. Both the scaling vector $h_j$, and the non-negative integer $n_j$ are examples of training sample indicators. The $r^{th}$ element of the scaling vector $h_j$ is the fraction of non-zero values in the $r^{th}$ column of $A_j$. Accordingly, the scaling vector $h_j$ may include a series of fractions indicating whether individual training samples include a non-zero value corresponding to certain features. Additionally, non-negative integer $n_j$ is the number of rows in $A_j$. Accordingly, the non-negative integer $n_j$ may represent the number of training samples in an input data matrix $A_j$.

In response to receiving the modified-parameter-indicator sets 514a and 514b from the client devices 506a and 506b—and any additional client devices that are part of a subset of client devices $\phi^i$—the asynchronous training system 106 generates adjusted global parameters. In particular, the asynchronous training system 106 determines a weighted average of the modified-parameter-indicator sets 514a and 514b based on the training sample indicators for each corresponding client device—that is, based on the scaling vector $h_j$ and the non-negative integer $n_j$ from the client devices 506a and 506b. Having weighted and averaged the modified-parameter-indicator sets 514a and 514b, the asynchronous training system 106 further adjusts the global parameters 504 based on the weighted average to generate adjusted global parameters. To generate the adjusted global parameters $z^i$ and $u^i$, in some embodiments, the asynchronous training system 106 performs Steps 4-7 of Algorithm 1 shown in Table 1 above. As indicated by Steps 6 and 7, the asynchronous training system 106 generates an adjusted global parameter $z^i$ and an adjusted global parameter $u^i$ for a subsequent training iteration.

As indicated by Step 4 of Algorithm 1, in some embodiments, the asynchronous training system 106 determines that a threshold number of client devices S have sent parameter update differentials for a training iteration before adjusting the global parameters $z^{i-1}$ and $u^{i-1}$, where S≤K. Using the threshold number of client devices S (instead of all client devices K) expedites training iterations by preventing the asynchronous training system 106 from waiting for all client devices K to send parameter update differentials before adjusting global parameters. But slower client devices may send parameter update differentials less often. Even when such slower client devices send such differentials, the parameter update differentials may be outdated and based on older versions of the global parameters z and u.

To ensure that client devices participate in updating the global parameters z and u and send parameter update differentials closer in proximity to a current version of the global parameters, in some embodiments, the asynchronous training system 106 introduces a bounded delay condition. For example, in some implementations, the asynchronous training system 106 identifies a parameter-update-iteration indicator for a client device indicating a number of training iterations since the client device sent a set of parameter update differentials. The asynchronous training system 106 then determines that the parameter-update-indicator for the client device satisfies the threshold number of training iterations. When the parameter-update-indicator satisfies the threshold number, the asynchronous training system 106 holds the training iteration (e.g., waits) until receiving modified parameter indicators from the client device. In some such cases, the asynchronous training system 106 sends a request for parameter update differentials to the client device as part of holding the training iteration until receiving modified parameter indicators from particular client devices.

As shown in Step 5 of Algorithm 1, for instance, the asynchronous training system 106 waits to receive parameter update differentials from all client devices $j \in \{1, \ldots, K\}$ for which a parameter-update-iteration indicator T is greater than (or equal to) a threshold number of training iterations T. In this manner, the asynchronous training system 106 can ensure that updates from each device are used at least one in T iterations. In some embodiments, the parameter-update-iteration indicator T may be a vector reflecting the number of training iterations that have passed for each client device without receiving modified parameter indicators from the client device. Upon receiving parameter update differentials from such client devices, the asynchronous training system 106 adds these client devices to a subset of client devices $\phi^i$ for a given training iteration.

As further indicated by Steps 6-7 of Algorithm 1, in some embodiments, the asynchronous training system 106 uses the parameter update differentials $(z_j^i - z^{i-1})$ and $(u_j^i - u^{i-1})$, a scaling vector $h_j$, and a non-negative integer $n_j$ to adjust the global parameters $z^{i-1}$ and $u^{i-1}$. The symbol ⊙ indicates an element-wise multiplication operation between two vectors and $n = \Sigma_{j \in \phi^i} n_j$. Depending on the values of the non-negative integer $n_j$ and depending on whether 1≤j≤K, in some embodiments, the asynchronous training system 106 assigns weights to the parameter update differentials from each client device differently. The asynchronous training system 106 weights parameter update differentials from a client device more heavily when the non-negative integer $n_j$ indicates a greater number of non-zero data points.

Moreover, the asynchronous training system 106 relies on the scaling vector $h_j$ from the $j^{th}$ client device to determine the relative importance of each coordinate in a client device's parameter update differential. The asynchronous training system 106 further uses the scaling vector $h_j$ from the $j^{th}$ client device to adjust for the number of non-zero realizations for each coordinate in the client training dataset 508, such as the input data matrix $A_j$ and the response vector $b_j$. Together, the non-negative integer $n_j$ and the scaling vector $h_j$ can control and stabilize training iterations against outlier client devices when the asynchronous training system 106 relies on parameter update differentials to adjust global parameters.

As indicated by Algorithm 1, Steps 8-11, after generating the adjusted global parameters $z^i$ and $u^i$, the asynchronous training system 106 updates the parameter-update-iteration indicator T for each client device. When the $j^{th}$ client device is part of the subset of client devices $\phi^i$ for a given training iteration, the asynchronous training system 106 sets T[j] to 1. When the $j^{th}$ client device is not part of the subset of client devices $\phi^i$ for a given training iteration, the asynchronous training system 106 adds a 1 to T[j].

Although not shown in Table 1 or FIG. 5, in certain embodiments, a client device that malfunctions or is otherwise unresponsive may stall the asynchronous training system 106 at Step 5 of Algorithm 1 or prevent the asynchronous training system 106 from finishing Algorithm 1. To avoid such stalls or obstructions, in some embodiments, the asynchronous training system 106 sends a request for parameter update differentials to a client device that has not sent parameter update differentials within the threshold number of training iterations T. If the client device does not send a set of parameter update differentials within a threshold time, asynchronous training system 106 removes or purges the client device from K, which again represents the group of client devices that the asynchronous training system 106 uses for adjusting the global parameters z and u.

Relatedly, by adjusting the threshold number of client devices S in Algorithm 1, the asynchronous training system 106 can shift training approaches between fully synchronous and fully asynchronous. For instance, by setting S=K, Algorithm 1 would become fully synchronous and likely slow or obstruct the asynchronous training system 106 from reaching convergence because not all client devices are continuously available to send modified parameter indicators. By setting S=1, Algorithm 1 would become fully asynchronous, likely experience high variance in the value of global parameters from training iteration to training iteration, and slow the asynchronous training system 106 in reaching convergence because more training iterations would be needed to satisfy a statistical threshold for converging global parameters.

While FIG. 5 depicts the asynchronous training system 106 implementing the regression models, in other embodiments, the asynchronous training system 106 trains a variety of different machine learning models, including, but not limited to neural networks or support vector machines. For example, in some embodiments, the asynchronous training system 106 hosts a global neural network and uses client devices that implement local neural networks to learn global-neural-network parameters for layers of a global neural network hosted by the asynchronous training system 106. In some such embodiments, the asynchronous training system 106 sends global-neural-network parameters for the global neural network model to a group of client devices. After receiving the global-neural-network parameters, a subset of client devices from the group implement the global-neural-network parameters within their respective local neural networks to generate locally modified parameters. In some such embodiments, the subset of client devices solve equation (8) locally to generate the locally modified parameters. Based on the locally modified parameters, the subset of client devices send modified parameter indicators for the global-neural-network parameters to the server(s) 102.

In response to receiving modified parameter indicators from the subset of client devices, the asynchronous training system 106 adjusts the global-neural-network parameters to generate adjusted global-neural-network parameters for a subsequent iteration. As above, in some such embodiments, the asynchronous training system 106 performs any of the actions described above, including, but not limited to, tracking the number of training iterations in which a client device sends modified parameter indicators, utilizing a partial barrier to include a broader range of client devices with differing computing capabilities, and sending requests to client devices that have not sent modified parameter indicators within a threshold number of training iterations to account for edge cases.

Figure 6:
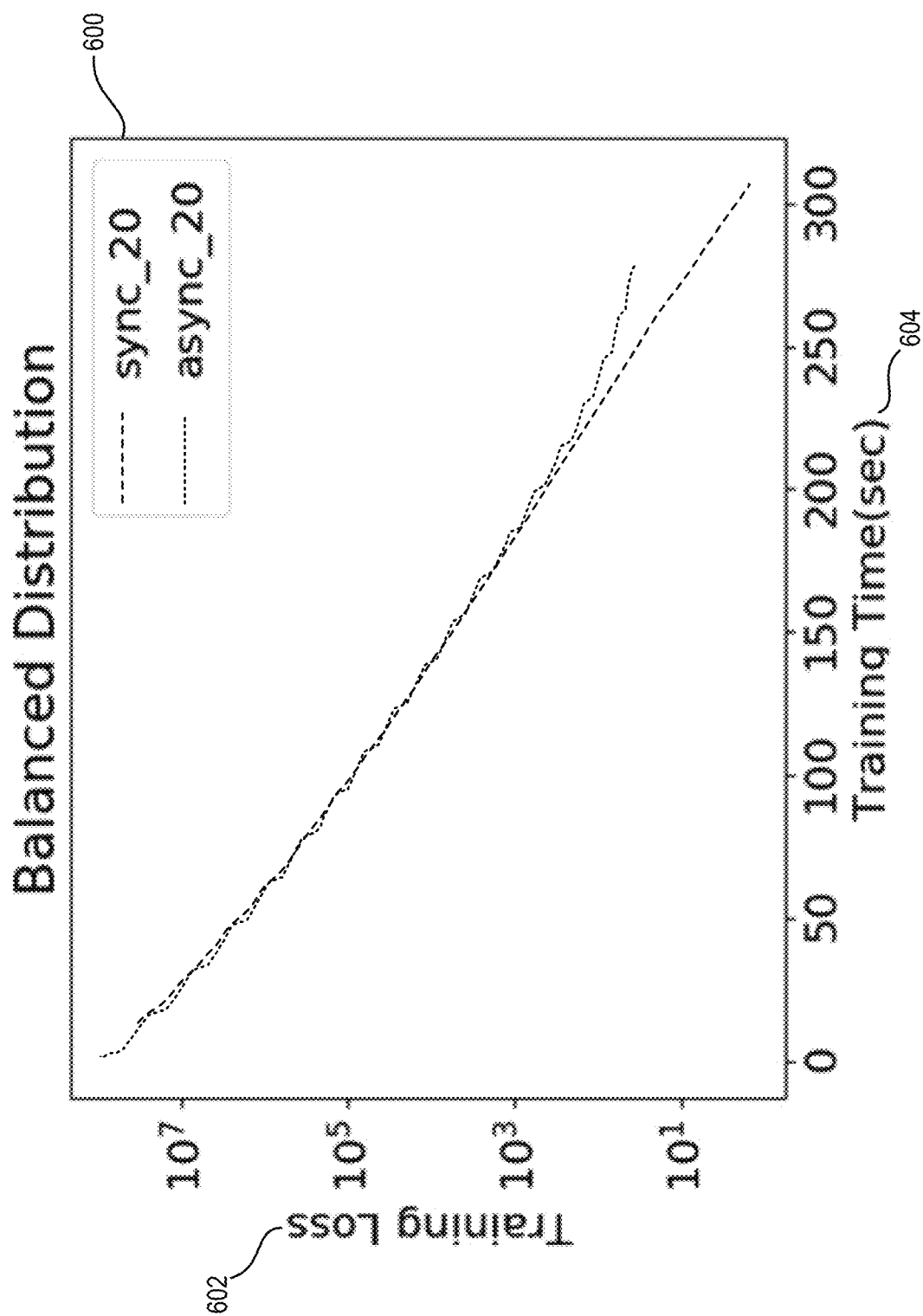
FIG. 6 illustrates a comparison graph depicting training losses of an asynchronous training system and a synchronous training system in accordance with one or more embodiments.

To test the efficacy of the asynchronous training system 106, researchers conducted an experiment comparing the asynchronous training system 106 using AFADMM to a synchronous training system using FADMM. As suggested above, the synchronous FADMM corresponds to setting τ=1 and S=K in Algorithms 1 and 2. The synchronous FADMM served as a baseline for the AFADMM to measure whether AFADMM learns quality global parameters and converges in less time in the presence of network delays. FIG. 6 illustrates the results of the experiment in a comparison graph 600 that depicts training losses of the asynchronous training system 106 and a synchronous training system in accordance with one or more embodiments.

As part of conducting the experiment, the researchers used a training dataset $A_k$, $b_k$ $\forall k \in \{1, 2 \ldots, K\}$ containing about n=1,000,000 rows in an input data matrix A, with each row represented by about m=1,000 features. The researchers evenly distributed some of the dataset to the asynchronous training system 106 to run AFADMM and some of the dataset to the synchronous training system to run FADMM. To ensure that both the asynchronous training system 106 and the synchronous training system received a non-identical and independent distribution, the researchers sorted the training dataset before distributing it to the asynchronous training system 106 and the synchronous training system.

While conducting the experiment, the researchers observed how many training iterations until the cumulative loss across all client devices converged for the asynchronous training system 106 and the synchronous training system. The number of training iterations indicates how quickly the AFADMM or the FADMM learns global parameters with limited communications between servers and client devices. As a measure of training loss, the researchers used the following equation for the cumulative loss at the $i^{th}$ training iteration:

$$Loss^i = \frac{1}{2}\sum_{k=1}^{K} l_k(w^i) \qquad (11)$$

To simulate the number of client devices for the experiment, the researchers used a high-performance computing device as the server and resource constrained desktop machines to run AFADMM and FADMM locally. The researchers also varied the number of training iterations for AFADMM and FADMM on client devices to vary the volume of training data. To mimic network delays, the researchers added random delays to each client device by sampling from a Poisson distribution with a mean of 5 seconds. Researchers conducted the experiment under the balanced setting, giving the same volume of data to each client device (e.g., 500 data points were assigned to each client device in both the AFADMM and FADMM setting according to the sorted order mentioned above).

As shown in FIG. 6, the comparison graph 600 includes a training-loss plot for the AFADMM (shown as async_20 in a key) and the FADMM (shown as sync_20 in the key). FIG. 6 depicts both training-loss plots along a training-loss axis 602 indicating a loss determined by equation (11) and a training-time axis 604 indicating time in seconds. As indicated by the training-loss plots for the AFADMM and the FADMM, the synchronous training system takes a longer time to converge on global parameters implementing FADMM than the asynchronous training system 106 takes to converge on global parameters. While the researchers used 20 client devices to conduct the experiment, the difference in convergence times shown in the comparison graph 600 would increase as the number of client devices increases. As further indicated by the training-loss plots in the comparison graph 600, the training loss for AFADMM is less than the training loss for the FADMM during early training iterations, which indicates that AFADMM generates better statistical quality.

Figure 7:
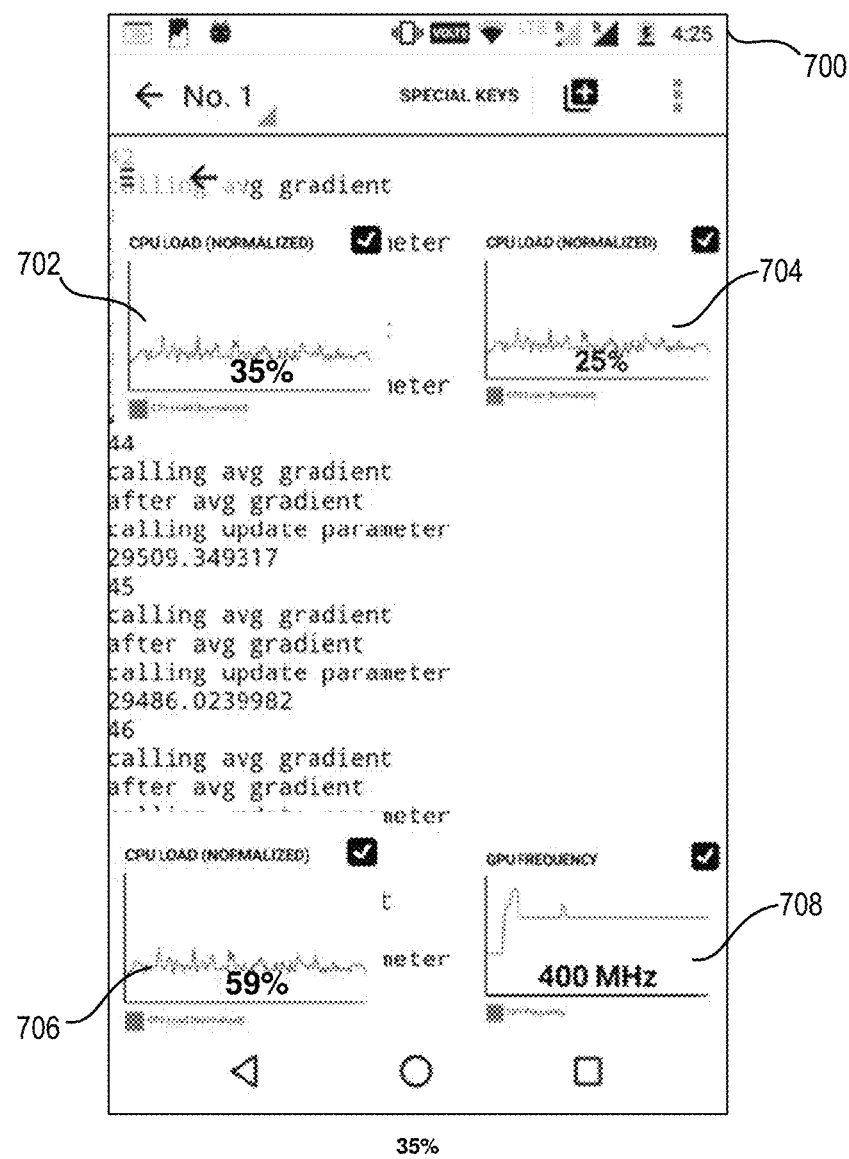
FIG. 7 illustrates performance parameters for a client device executing a local machine learning model in accordance with one or more embodiments.

Turning now to FIG. 7, this figure illustrates a graphical user interface 700 of a client device presenting various performance parameters for the client device executing a local machine learning model in accordance with one or more embodiments. The graphical user interface 700 depicts a screenshot of actual performance parameters. As shown in FIG. 7, the client device corresponding to the graphical user interface 700 is a resource-constrained device, such as a smartphone. As indicated by the graphical user interface 700, the client device is executing a native application during a training iteration of a local machine learning model.

During the training iteration, the local machine learning model consumes relatively little computing resources. The central processing unit ("CPU") and graphics processing unit ("GPU") load statistics indicate that the local machine learning model is not computation intensive and does not significantly affect the client device's ability to perform normal processes. In particular, as shown within the graphical user interface 700, a CPU-load graph 702 indicates a CPU load of 35% for the local machine learning model, a CPU-load graph 704 indicates a normalized CPU load of 25% for the local machine learning model, a GPU-load graph 706 indicates a GPU load of 59% for the local machine learning model, and a GPU-frequency graph 708 indicates a GPU frequency of 400 megahertz for the local machine learning model.

Figures 8A, 8B:
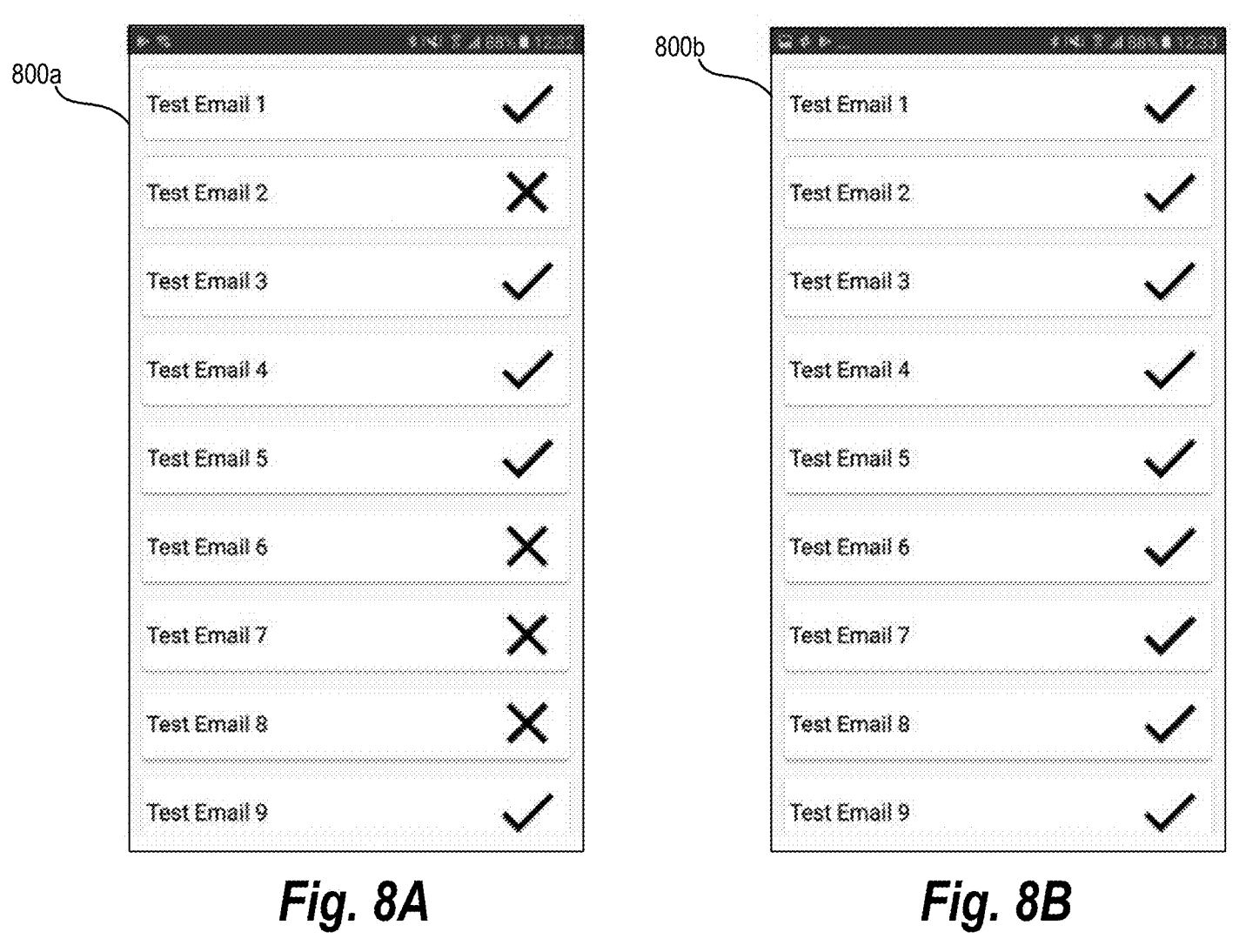

In addition to evaluating training loss and performance parameters of the asynchronous training system 106, researchers also tested the efficacy of a local machine learning model within an example application on a client device. In particular. FIGS. 8A and 8B illustrate some of the results from the tests within the example application. In particular, FIGS. 8A and 8B respectively illustrate graphical user interfaces 800*a* and 800*b* of a spam-email-detector application showing the accuracy of a machine learning model in multiple training iterations of classifying emails in accordance with one or more embodiments.

To conduct the test, researchers created the spam-email-detector application to classify emails locally on computing devices. Consistent with the disclosure above, the asynchronous training system 106 used the AFADMM approach described above to train an l1-norm regularized logistic regression model on ten computing devices executing the spam-email-detector application. The researchers used approximately 3700 emails in total (i.e., 370 emails to each of ten computing devices. The emails came from a spambase dataset of the University of California, Irvine, Dua Dheeru and Efi Karra Taniskidou, Machine Learning Repository (2017).

The graphical user interfaces 800*a* and 800*b* of FIGS. 8A and 8B represent screenshots of spam detection accuracy on a client device at the end of a first and fifth training iteration, respectively. As training iterations progressed, the local logistic regression model improved in accurately classifying emails as spam or not spam. As indicated by the check marks and x marks in the graphical user interface 800*a* in FIG. 8A, the client device accurately classified a representative five of nine emails during the first training iteration. As indicated by the check marks and x marks in the graphical user interface 800*b* in FIG. 8B, the client device accurately classified a representative nine of nine emails during the fifth training iteration.

The classification accuracy depicted in graphical user interfaces 800*a* and 800*b* are illustrative and based on more precise measurements. The researchers evaluated the ability of the spam-email-detector application to classify emails based on metrics of precision, recall, and $F_{1_-}$ score at the end of the first and fifth training iterations. At the end of the first training iteration, the spam-email-detector application demonstrated a precision rate of 34.37%, a recall rate of 58.63%, and an $F_{1_-}$ score of 43.34%. At the end of the fifth training iteration, the spam-email-detector application demonstrated a precision rate of 83.39%, a recall rate of 83.28%, and an $F_1$ score of 83.05%.

Figure 9:
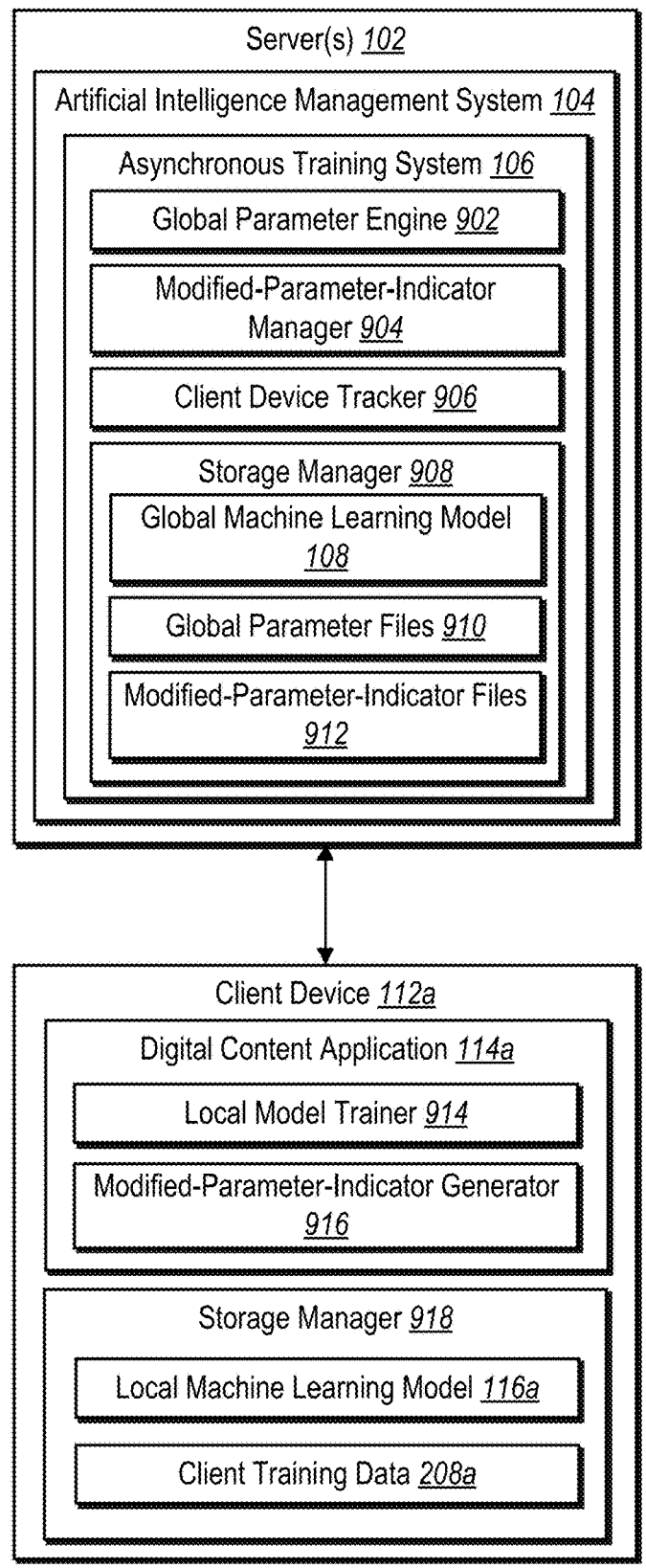
FIG. 9 illustrates a schematic diagram of the asynchronous training system of FIG. 1 in accordance with one or more embodiments.

Turning now to FIG. 9, this figure provides additional detail regarding components and features of the asynchronous training system 106. In particular, FIG. 9 illustrates the server(s) 102 implementing the artificial intelligence management system 104 and the asynchronous training system 106 and the client device 112 implementing the digital content application 114*a*. As discussed above, in some embodiments, the asynchronous training system 106 is also implemented via one or more client devices. For instance, in one or more embodiments the asynchronous training system 106 is implemented by the client device 112*a* and also includes the components 914-918 illustrated in FIG. 9.

As shown in FIG. 9, the server(s) 102 include the artificial intelligence management system 104. In some embodiments, the artificial intelligence management system 104 uses its components generate, train, and apply machine learning models. For example, the artificial intelligence management system 104 can generate and utilize machine learning models to analyze, modify, manage, and perform tasks for digital content campaigns or analyze, create, or modify digital images or digital texts. Alternatively, the artificial intelligence management system 104 can determine digital content that would interest users of client devices and send digital content of interest to the client devices. Additionally, or alternatively, the artificial intelligence management system 104 can categorize digital content that reflects user preferences and identifies digital content received by the client devices.

As further shown in FIG. 9, the server(s) 102 include the asynchronous training system 106. The asynchronous training system 106 includes, but is not limited to, a global parameter engine 902, modified-parameter-indicator manager 904, client device tracker 906, and storage manager 908. The following paragraphs describe each of these components in turn.

The global parameter engine 902 initiates and adjusts global parameters for the global machine learning model 108. For example, in some embodiments, the global parameter engine 902 determines a weighted average for modified parameter indicators corresponding to a global parameter. The global parameter engine 902 can further generate an adjusted global parameter based on the weighted average, such as by increasing or decreasing a value representing a global parameter according to the weighted average of modified parameter indicators. In some embodiments, the global parameter engine 902 also determines when training iterations have reached a point of convergence, such as when modified parameter indicators indicate differences within a threshold from global parameters over multiple training iterations.

As further shown in FIG. 9, the modified-parameter-indicator manager 904 receives and, in some cases, determines weights for modified parameter indicators. For example, in some implementations, the modified-parameter-indicator manager 904 assigns a weight to (or determines a weight for) modified parameter indicators from a particular client device. In some such cases, the modified-parameter-indicator manager 904 assigns or determines such a weight based on training sample indicators from a client-training dataset corresponding to the client device (e.g., a number of training samples). Additionally, in certain implementations, the modified-parameter-indicator manager 904 determines when the asynchronous training system 106 has received modified parameter indicators from a threshold number of client devices for a given training iteration and sends an indication of having satisfied the threshold number to the global parameter engine 902.

As further shown in FIG. 9, the client device tracker 906 tallies or tracks the number of training iterations in which a client device sends modified parameter indicators. For example, in some embodiments, the client device tracker 906 identifies a client device (from among a group of participating client devices) that has not sent a set of modified parameter indicators to the server(s) 102 in a threshold number of training iterations. When a client device reaches the threshold number, the client device tracker 906 sends a request for modified parameter indicators to the client device and waits for a threshold time to include the client device in the current training iteration.

If the client device subsequently sends a modified-parameter-indicator set, in certain implementations, the modified-parameter-indicator manager 904 adds the modified-parameter-indicator set to other modified parameter indicators for adjusting global parameters for that particular training iteration. If the client device does not send modified parameter indicators within a threshold time, in some cases, the client device tracker 906 removes or purges the client device from a group of client devices that the asynchronous training system 106 uses for adjusting the global parameters.

As also shown in FIG. 9, the asynchronous training system 106 includes the storage manager 908. In certain embodiments, the storage manager 908 includes non-transitory computer readable media. Among other things, the storage manager 908 maintains the global machine learning model 108, global parameter files 910, and/or modified-parameter-indicator files 912. The storage manager 908 maintains the global machine learning model 108 both during and/or after the asynchronous training system 106 learns global parameters for the global machine learning model 108. Additionally, in some embodiments, the storage manager 908 maintains the global parameter files 910 for access, analysis, and retrieval by the global parameter engine 902 and/or the modified-parameter-indicator files 912 for access, analysis, and retrieval by the modified-parameter-indicator manager 904.

Turning back to the client device 112a, as shown in FIG. 9, the client device 112a includes, but is not limited to, the digital content application 114a and a storage manager 918. Each of the client devices 112b-112n may include similar components with similar corresponding functions as described below. The following paragraphs describe each of the components in turn.

As shown in FIG. 9, the digital content application 114a includes a local model trainer 914. The local model trainer 914 receives global parameters from the server(s) 102 and runs training iterations by implementing the global parameters within the local machine learning model 116a and generating locally modified parameters. The local model trainer 914 may use any of the methods, equations, processes described above to implement global parameters and generate locally modified parameters. Consistent with the disclosure above, in some embodiments, the local model trainer 914 solves equation (8) during training iterations.

As further shown in FIG. 9, the digital content application 114a includes the modified-parameter-indicator generator 916. The modified-parameter-indicator generator 916 generates modified-parameter-indicator sets and sends modified-parameter-indicator sets to the server(s) 102. For example, in some embodiments, the modified-parameter-indicator generator 916 determines a difference between a locally modified parameter and a global parameter and generates a parameter update differential representing the difference. By contrast, in certain embodiments, in some embodiments, the modified-parameter-indicator generator 916 uses locally modified parameters themselves as modified parameter indicators and sends the locally modified parameters to the server(s) 102.

As also shown in FIG. 9, the client device 112 includes the storage manager 918. In certain embodiments, the storage manager 918 includes non-transitory computer readable media. Among other things, the storage manager 918 maintains the local machine learning model 116a and/or the client training data 208a. In some embodiments, the storage manager 918 maintains the local machine learning model 116a for access, analysis, and retrieval by the local model trainer 914 and/or the client training data 208a for access, analysis, and retrieval by the local model trainer 914.

Each of the components 108, 114a, 116a, 208a, and 902-916 can include software, hardware, or both. For example, the components 108, 114a, 116a, 208a, and 902-916 can include one or more instructions stored on a computer-readable storage medium and executable by processors of one or more computing devices, such as a client device or server device. When executed by the one or more processors, the computer-executable instructions of the asynchronous training system 106 or the digital content application 114a can cause the computing device(s) to perform the machine learning methods described herein. Alternatively, the components 108, 114a, 116a, 208a, and 902-916 can include hardware, such as a special-purpose processing device to perform a certain function or group of functions. Alternatively, the components 108, 114a, 116a, 208a, and 902-916 can include a combination of computer-executable instructions and hardware.

Furthermore, the components 108, 114a, 116a, 208a, and 902-916 may, for example, be implemented as one or more operating systems, as one or more stand-alone applications, as one or more modules of an application, as one or more plug-ins, as one or more library functions or functions that may be called by other applications, and/or as a cloud-computing model. Accordingly, the components 108, 114a, 116a, 208a, and 902-916 may be implemented as a stand-alone application, such as a desktop or mobile application. Furthermore, the components 108 and 902-912 of the asynchronous training system 106 may be implemented as one or more web-based applications hosted on a remote server. The components 114a, 116a, 208a, 914, and 916 of the client device 112a may also be implemented in a suite of mobile device applications or "apps." To illustrate, the components 108, 114a, 116a, 208a, and 902-916 may be implemented in a software application, including but not limited to ADOBE® CREATIVE CLOUD®, ADOBE MARKETING CLOUD®, ADOBE CAMPAIGN®, ADOBE® ANIMATE, ADOBE® CHARACTER ANIMATER, ADOBE® AFTER EFFECTS®, ADOBE EXPERIENCE MANAGER®, ADOBE® PHOTOSHOP®, ADOBE® LIGHTROOM®, or ADOBE TARGET®. "ADOBE," "ANIMATE," "CHARACTER ANIMATER," "AFTER EFFECTS," "CREATIVE CLOUD," "ADOBE CAMPAIGN," "ADOBE EXPERIENCE MANAGER," "PHOTOSHOP," "LIGHTROOM," and "ADOBE TARGET" are either registered trademarks or trademarks of Adobe Systems Incorporated in the United States and/or other countries.

Figure 10:
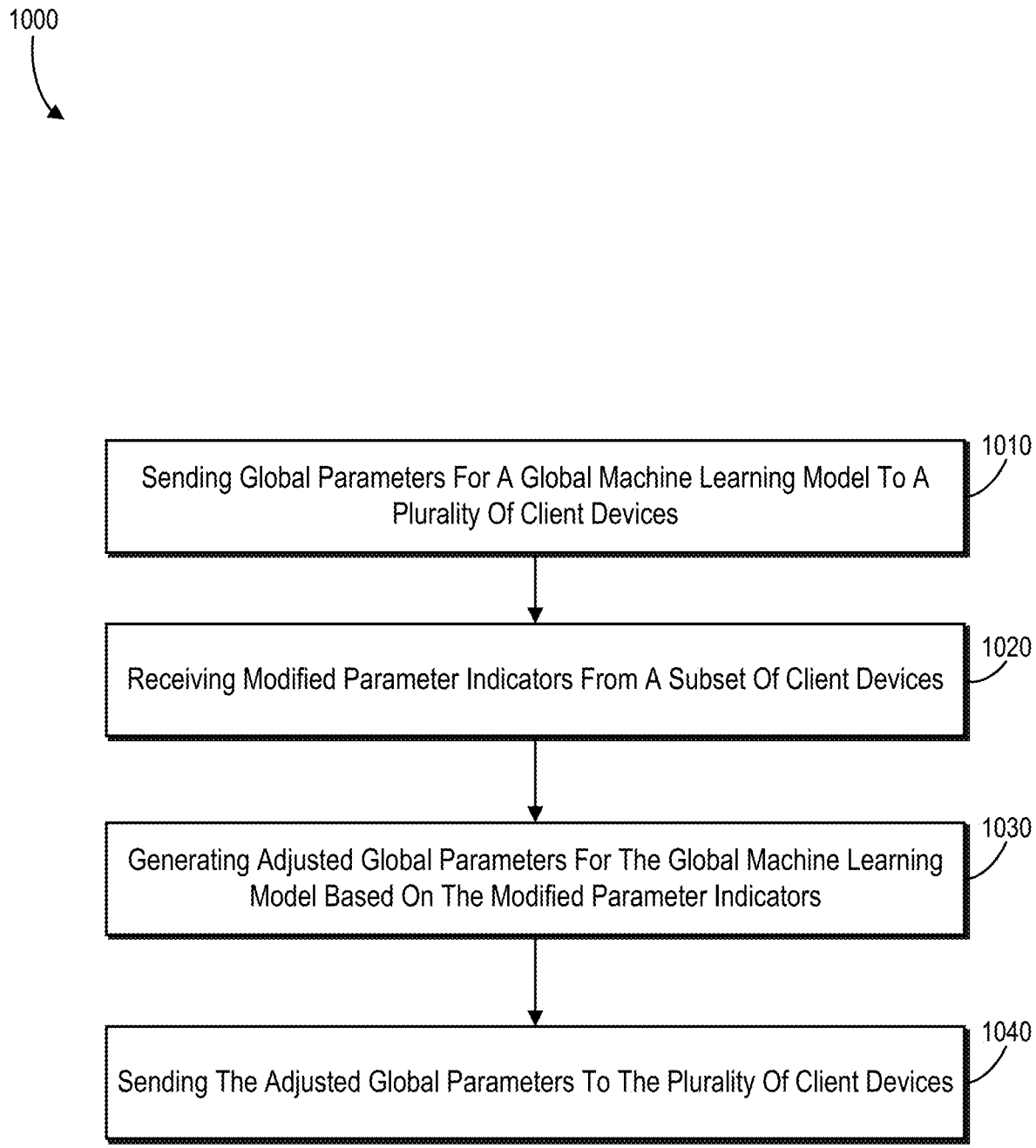
FIG. 10 illustrates a flowchart of a series of acts for asynchronously training a machine learning model across client devices in accordance with one or more embodiments.

Turning now to FIG. 10, this figure illustrates a flowchart of a series of acts 1000 of asynchronously training a machine learning model across client devices in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of sending global parameters for a global machine learning model to a plurality of client devices. For example, in some embodiments, the act 1010 includes sending global parameters for a global machine learning model to a plurality of client devices, the plurality of client devices comprising local machine learning models corresponding to the global machine learning model. In some such embodiments, the global machine learning model comprises a regression model or a neural network stored at a server device and the local machine learning models comprise corresponding regression models or corresponding neural networks stored at the plurality of client devices.

As further shown in FIG. 10, the acts 1000 include an act 1020 of receiving modified parameter indicators from a subset of client devices. For example, in certain embodiments, the act 1020 includes receiving modified parameter indicators from a subset of client devices of the plurality of client devices, wherein the subset of client devices utilize the local machine learning models, the global parameters, and client training data on the subset of client devices to generate the modified parameter indicators.

In one or more embodiments, receiving the modified parameter indicators from the subset of client devices comprises receiving the modified parameter indicators from the subset of client devices without receiving the client training data from the subset of client devices. In some such embodiments, the modified parameter indicators do not disclose client training data from the subset of client devices. Additionally, in some implementations, the modified parameter indicators comprise parameter update differentials that each represent a difference between a locally modified parameter generated by a client device and a global parameter generated by the server device.

As further shown in FIG. 10, the acts 1000 include an act 1030 of generating adjusted global parameters for the global machine learning model based on the modified parameter indicators. For example, in certain implementations, the act 1030 includes, in response to receiving the modified parameter indicators from the subset of client devices, generating adjusted global parameters.

As suggested above, in one or more embodiments, generating the adjusted global parameters for the global machine learning model comprises: determining that the subset of client devices includes a threshold number of client devices from among the plurality of client devices that have generated the modified parameter indicators; and in response to determining that the subset of client devices includes the threshold number of client devices, generating the adjusted global parameters for the global machine learning model.

Additionally, in some embodiments, generating the adjusted global parameters for the global machine learning model comprises: identifying a client device, from among the plurality of client devices, that has not sent a set of modified parameter indicators to the system in a threshold number of training iterations; sending a request for modified parameter indicators to the client device; and after receiving a requested set of modified parameter indicators from the client device, generating the adjusted global parameters for the global machine learning model. Relatedly, in some implementations, identify the client device from among the plurality of client devices comprises: identifying a parameter-update-iteration indicator for the client device indicating a number of training iterations since the client device has sent a set of modified parameter indicators; and determining that the parameter-update-iteration indicator for the client device satisfies the threshold number of training iterations.

As noted above, the asynchronous training system 106 can tally or track the number of training iterations in which a client device sends modified parameter indicators. Accordingly, generating the adjusted global parameters for the global machine learning model comprises: sending a request for modified parameter indicators to a client device, from among the plurality of client devices, that has not sent a set of modified parameter indicators to the system in a threshold number of training iterations; and in response to determining that the client device has not responded to the request for modified parameter indicators within a threshold time, removing the client device from a group of client devices that the system uses for adjusting the global parameters.

Additionally, in some embodiments, generating the adjusted global parameters for the global machine learning model comprises: determining weighted averages for the parameter update differentials; and generating the adjusted global parameters based on the weighted averages for the parameter update differentials.

As further shown in FIG. 10, the acts 1000 include an act 1040 of sending the adjusted global parameters to the plurality of client devices. For example, in some embodiments, the act 1040 includes sending the adjusted global parameters for the global machine learning model to the plurality of client devices for implementation in the local machine learning models at the plurality of client devices.

In addition to the acts 1010-1040, in some embodiments, the acts 1000 further include generating global-neural-network parameters for layers of a global neural network stored at a server device; and identifying client devices comprising local neural networks corresponding to the global neural network. By contrast, in some embodiments, the acts 1000 further include generating weights for a global regression model stored at the server device; and identifying client devices comprising local regression models corresponding to the global regression model.

Moreover, in one or more embodiments, the acts 1000 further include receiving, from a client device of the subset of client devices, a number of training samples from a client-training dataset corresponding to the client device; and determining a weight for a parameter update differential based on the number of training samples; and determining the weighted averages for the parameter update differentials based on the weight for the parameter update differential.

In addition (or in the alternative) to the acts describe above, in some embodiments, the acts 1000 include a step for asynchronously training the global machine learning model by iteratively sending the global parameters to the plurality of client devices, receiving modified parameter indicators, and updating the global parameters. For instance, the algorithms and acts described in reference to FIG. 3B can comprise the corresponding acts for a step for asynchronously training the global machine learning model by iteratively sending the global parameters to the plurality of client devices, receiving modified parameter indicators, and updating the global parameters.

Figure 11:
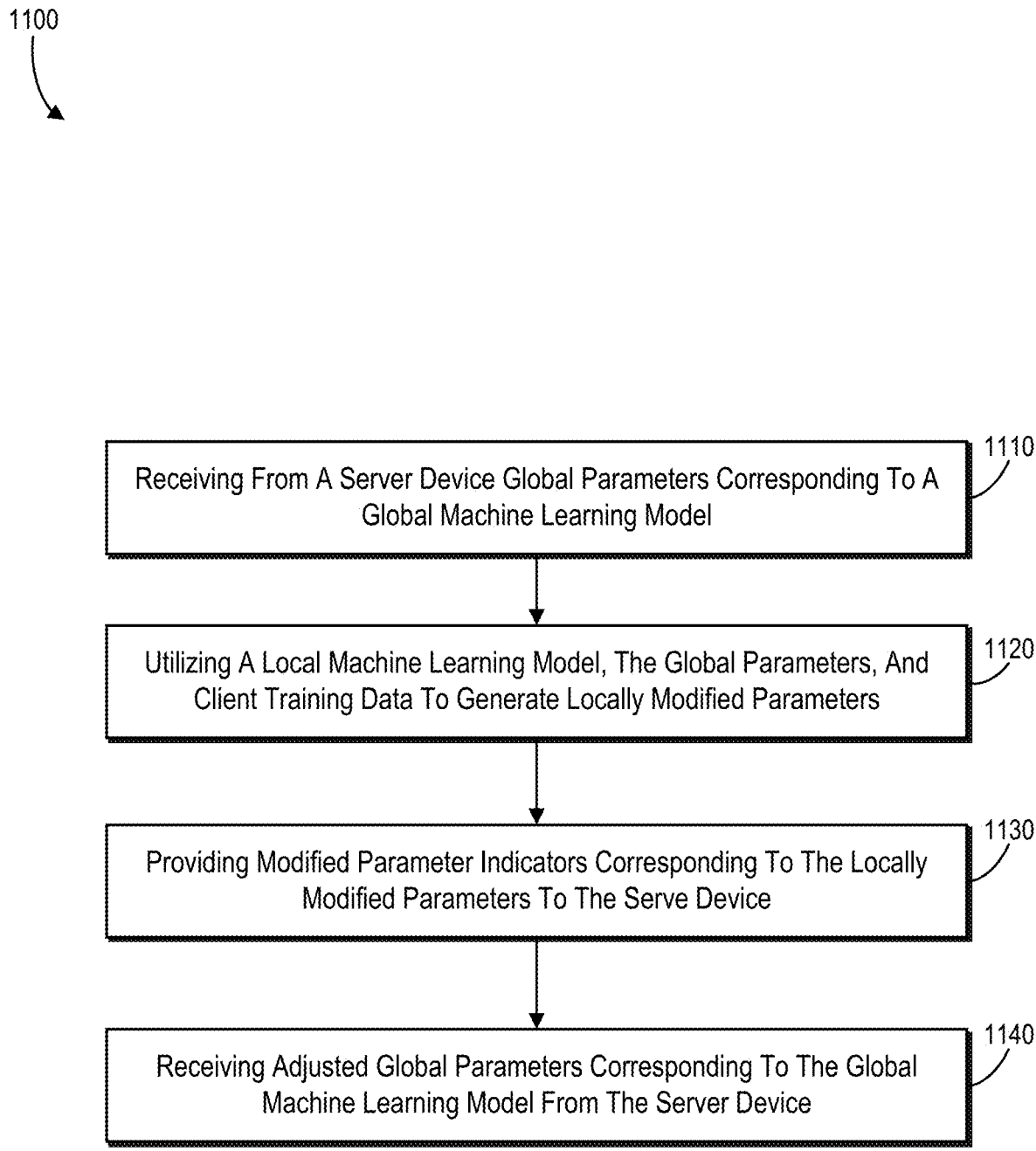
FIG. 11 illustrates a flowchart of a series of acts for a client device generating locally modified parameters and providing modified parameter indicators in accordance with one or more embodiments.

Turning now to FIG. 11, this figure illustrates a flowchart of a series of acts 1100 of a client device generating locally modified parameters and providing modified parameter indicators in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of receiving, from a server device, global parameters corresponding to a global machine learning model. For example, in some embodiments, the act 1110 includes receiving, at the client device from a server device, global parameters corresponding to a global machine learning model at the server device, wherein the global machine learning model corresponds to a local machine learning model at the client device.

As further shown in FIG. 11, the acts 1100 include an act 1120 of utilizing a local machine learning model, the global parameters, and client training data to generate locally modified parameters. For example, in one or more embodiments, utilizing the local machine learning model, the global parameters, and the client training data to generate locally modified parameters comprises applying the global parameters in the local machine learning model to a set of client training data from the client training data at the client device to generate a predicted feature; and based on a comparison of the predicted feature and a ground-truth feature from the client training data that corresponds to the predicted feature, modifying the global parameters to generate the locally modified parameters.

As further shown in FIG. 11, the acts 1100 include an act 1130 of providing modified parameter indicators corresponding to the locally modified parameters to the server device. For example, in certain implementations, the act 1130 includes providing modified parameter indicators corresponding to the locally modified parameters to the server device, without providing the client training data to the server device, for the server device to utilize the modified parameter indicators in adjusting the global parameters.

As suggested above, in one or more embodiments, providing the modified parameter indicators to the server device comprises determining a first difference between a first locally modified parameter and a first global parameter and a second difference between a second locally modified parameter and a second global parameter; and generating a first parameter update differential representing the first difference and a second parameter update differential representing the second difference. By contrast, in some implementations, providing the modified parameter indicators to the server device comprises providing the locally modified parameters to the server device.

As further shown in FIG. 11, the acts 1100 include an act 1140 of receiving adjusted global parameters corresponding to the global machine learning model from the server device. For example, in some embodiments, the act 1140 includes receiving adjusted global parameters corresponding to the global machine learning model from the server device to implement in the local machine learning model at the client device.

In addition to the acts 1110-1140, in some embodiments, the acts 1100 further include generating a number of training samples from a client-training dataset; and providing the number of training samples to the server device as a basis for weighting the parameter update differentials when adjusting the global parameters. Additionally, in certain implementations, the acts 1100 further include, in response to receiving the adjusted global parameters corresponding to the global machine learning model from the server device, identifying additional client training data at the client device; and providing additional modified parameter indicators to the server device based on the additional client training data at the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
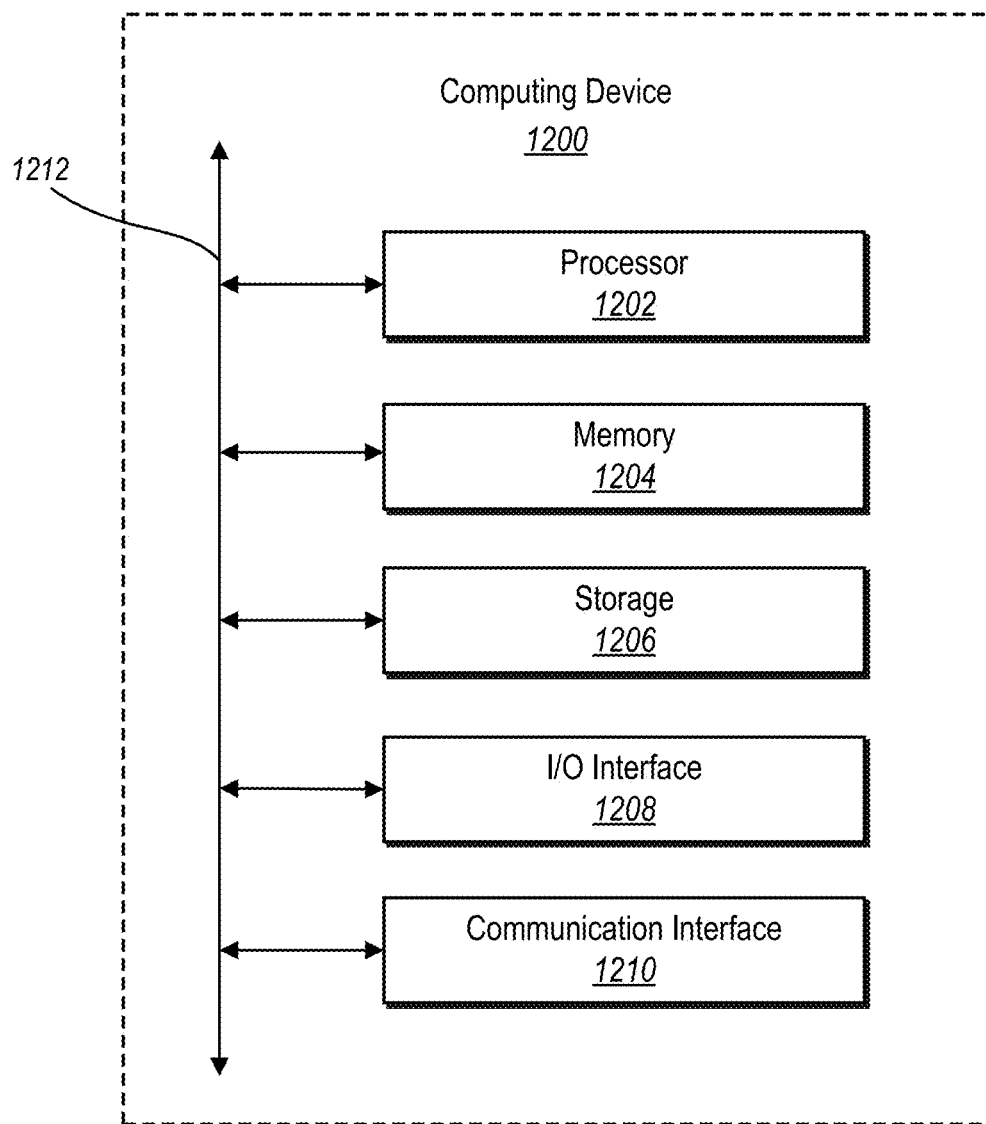
FIG. 12 illustrates a block diagram of an exemplary computing device for implementing one or more embodiments of the present disclosure.

FIG. 12 illustrates a block diagram of exemplary computing device 1200 that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
    sending global parameters for a global machine learning model to a plurality of client devices, the plurality of client devices comprising local machine learning models that represent local versions of the global machine learning model;
    receiving a first set of modified parameter indicators from a first client device of the plurality of client devices and a second set of modified parameter indicators from a second client device of the plurality of client devices, wherein the first client device and the second client device utilize the global parameters, client training data, and a first local machine learning model and a second machine learning model specific to the first client device and the second client device, respectively, to generate the first set of modified parameter indicators and the second set of modified parameter indicators;
    determining a first set of weights for the first set of modified parameter indicators specific to a first number of training samples corresponding to the first client device;
    determining a second set of weights for the second set of modified parameter indicators specific to a second number of training samples corresponding to the second client device;
    generating adjusted global parameters for the global machine learning model based on the first set of modified parameter indicators adjusted based on the first set of weights and the second set of modified parameter indicators adjusted based on the second set of weights; and
    sending the adjusted global parameters for the global machine learning model to the plurality of client devices for implementation in the local machine learning models at the plurality of client devices.

2. The computer-implemented method of claim 1, wherein:
    the adjusted global parameters for the global machine learning model comprises global-neural-network parameters for layers of a global neural network stored at a server device; and
    the local machine learning models comprise local neural networks associated with the global neural network.

3. The computer-implemented method of claim 1, further comprising determining the first set of weights and the second set of weights, respectively, after receiving the first set of modified parameter indicators from the first client device and receiving the second set of modified parameter indicators from the second client device.

4. The computer-implemented method of claim 1, wherein the first set of modified parameter indicators do not disclose client training data from the first client device.

5. The computer-implemented method of claim 1, wherein the first set of modified parameter indicators comprise parameter update differentials that each represent a difference between a locally modified parameter generated by the first client device and a global parameter generated by a server device.

6. A system for asynchronously training machine learning models across client devices while preserving client data privacy comprising:
    at least one processor; and
    at least one non-transitory computer memory comprising a global machine learning model and instructions that, when executed by at least one processor, cause the system to:
        send global parameters for the global machine learning model to a plurality of client devices, the plurality of client devices comprising local machine learning models that represent local versions of the global machine learning model;
        receive a first set of modified parameter indicators from a first client device of the plurality of client devices and a second set of modified parameter indicators from a second client device of the plurality of client devices, wherein the first client device and the second client device utilize the global parameters, client training data, and a first local machine learning model and a second machine learning model specific to the first client device and the second client device, respectively, to generate the first set of modified parameter indicators and the second set of modified parameter indicators;
        determine a first set of weights for the first set of modified parameter indicators specific to a first number of training samples corresponding to the first client device;
        determine a second set of weights for the second set of modified parameter indicators specific to a second number of training samples corresponding to the second client device;
        generate adjusted global parameters for the global machine learning model based on the first set of modified parameter indicators adjusted based on the first set of weights and the second set of modified parameter indicators adjusted based on the second set of weights; and
        send the adjusted global parameters for the global machine learning model to the plurality of client devices for implementation in the local machine learning models at the plurality of client devices.

7. The system of claim 6, further comprising instructions that, when executed by the at least one processor, cause the system to receive the first set of modified parameter indicators from the first client device without receiving the client training data from the first client device.

8. The system of claim 6, further comprising instructions that, when executed by the at least one processor, cause the system to:
  receive modified parameter indicators from a subset of client devices; and
  generate the adjusted global parameters for the global machine learning model by:
    determining that the subset of client devices includes a threshold number of client devices from among the plurality of client devices that have generated the modified parameter indicators; and
    in response to determining that the subset of client devices includes the threshold number of client devices, generating the adjusted global parameters for the global machine learning model.

9. The system of claim 6, further comprising instructions that, when executed by the at least one processor, cause the system to:
  receive modified parameter indicators from a subset of client devices; and
  generate the adjusted global parameters for the global machine learning model by:
    identifying a client device, from among the subset of client devices, that has not sent previous sets of modified parameter indicators to the system in a threshold number of training iterations; and
    generating the adjusted global parameters for the global machine learning model utilizing, from the received modified parameter indicators, one or more modified parameter indicators from the client device.

10. The system of claim 9, further comprising instructions that, when executed by the at least one processor, cause the system to identify the client device from among the plurality of client devices by:
  identifying a parameter-update-iteration indicator for the client device indicating a number of training iterations since the client device has sent a set of modified parameter indicators; and
  determining that the parameter-update-iteration indicator for the client device satisfies the threshold number of training iterations.

11. The system of claim 6, further comprising instructions that, when executed by the at least one processor, cause the system to generate the adjusted global parameters for the global machine learning model by:
  sending a request for modified parameter indicators to a client device, from among the plurality of client devices, that has not sent a set of modified parameter indicators to the system in a threshold number of training iterations; and
  in response to determining that the client device has not responded to the request for modified parameter indicators within a threshold time, removing the client device from a group of client devices that the system uses for adjusting the global parameters.

12. The system of claim 6, further comprising instructions that, when executed by the at least one processor, cause the system to determine the first set of weights for the first set of modified parameter indicators based on a number of features corresponding to the first client device.

13. The system of claim 6, further comprising instructions that, when executed by the at least one processor, cause the system to:
  receive the first set of modified parameter indicators from the first client device by receiving parameter update differentials that each represent a difference between a locally modified parameter generated by the first client device and a global parameter generated by a server device.

14. The system of claim 13, further comprising instructions that, when executed by the at least one processor, cause the system to generate the adjusted global parameters for the global machine learning model by:
  determining weighted averages for the parameter update differentials; and
  generating the adjusted global parameters based on the weighted averages for the parameter update differentials.

15. The system of claim 6, wherein the global machine learning model comprises a regression model or a neural network stored at a server device and the local machine learning models comprise associated with regression models or associated with neural networks stored at the plurality of client devices.

16. A non-transitory computer readable storage medium comprising instructions that, when executed by at least one processor, cause a client device to:
  receive, at the client device from a server device, global parameters corresponding to a global machine learning model at the server device, wherein a local machine learning model at the client device represents a local version of the global machine learning model;
  utilize the local machine learning model, the global parameters, and client training data at the client device to generate locally modified parameters;
  provide modified parameter indicators corresponding to the locally modified parameters to the server device and a number of training samples corresponding to the client device, without providing the client training data to the server device, for the server device to utilize the modified parameter indicators in adjusting the global parameters; and
  receive adjusted global parameters corresponding to the global machine learning model from the server device to implement in the local machine learning model at the client device, wherein the adjusted global parameters are based on weights determined for the modified parameter indicators using the number of training samples and additional modified parameter indicators from an additional client device weighted utilizing an additional number of training samples corresponding to the additional client device.

17. The non-transitory computer readable storage medium of claim 16, further comprising instructions that, when executed by the at least one processor, cause the client device to provide the modified parameter indicators to the server device by:
  determining a first difference between a first locally modified parameter and a first global parameter and a second difference between a second locally modified parameter and a second global parameter; and
  generating a first parameter update differential representing the first difference and a second parameter update differential representing the second difference.

18. The non-transitory computer readable storage medium of claim 17, further comprising instructions that, when executed by the at least one processor, cause the client device to provide a number of training iterations since the client device has sent a set of modified parameter indicators as basis for utilizing the modified parameter indicators in adjusting the global parameters.

19. The non-transitory computer readable storage medium of claim 16, further comprising instructions that, when executed by the at least one processor, cause the client device to utilize the local machine learning model, the global parameters, and the client training data at the client device to generate the locally modified parameters by:
- applying the global parameters in the local machine learning model to a set of client training data from the client training data at the client device to generate a predicted feature; and
- based on a comparison of the predicted feature and a ground-truth feature from the client training data that corresponds to the predicted feature, modifying the global parameters to generate the locally modified parameters.

20. The non-transitory computer readable storage medium of claim 16, further comprising instructions that, when executed by the at least one processor, cause the client device to, in response to receiving the adjusted global parameters corresponding to the global machine learning model from the server device:
- identify a second set of client training data at the client device; and provide a second set of modified parameter indicators to the server device based on the second set of client training data at the client device.

* * * * *